O. MALCHER.
COMPUTING AND PRINTING SCALE.
APPLICATION FILED APR. 6, 1916.
1,335,070.
Patented Mar. 30, 1920.
13 SHEETS—SHEET 4.
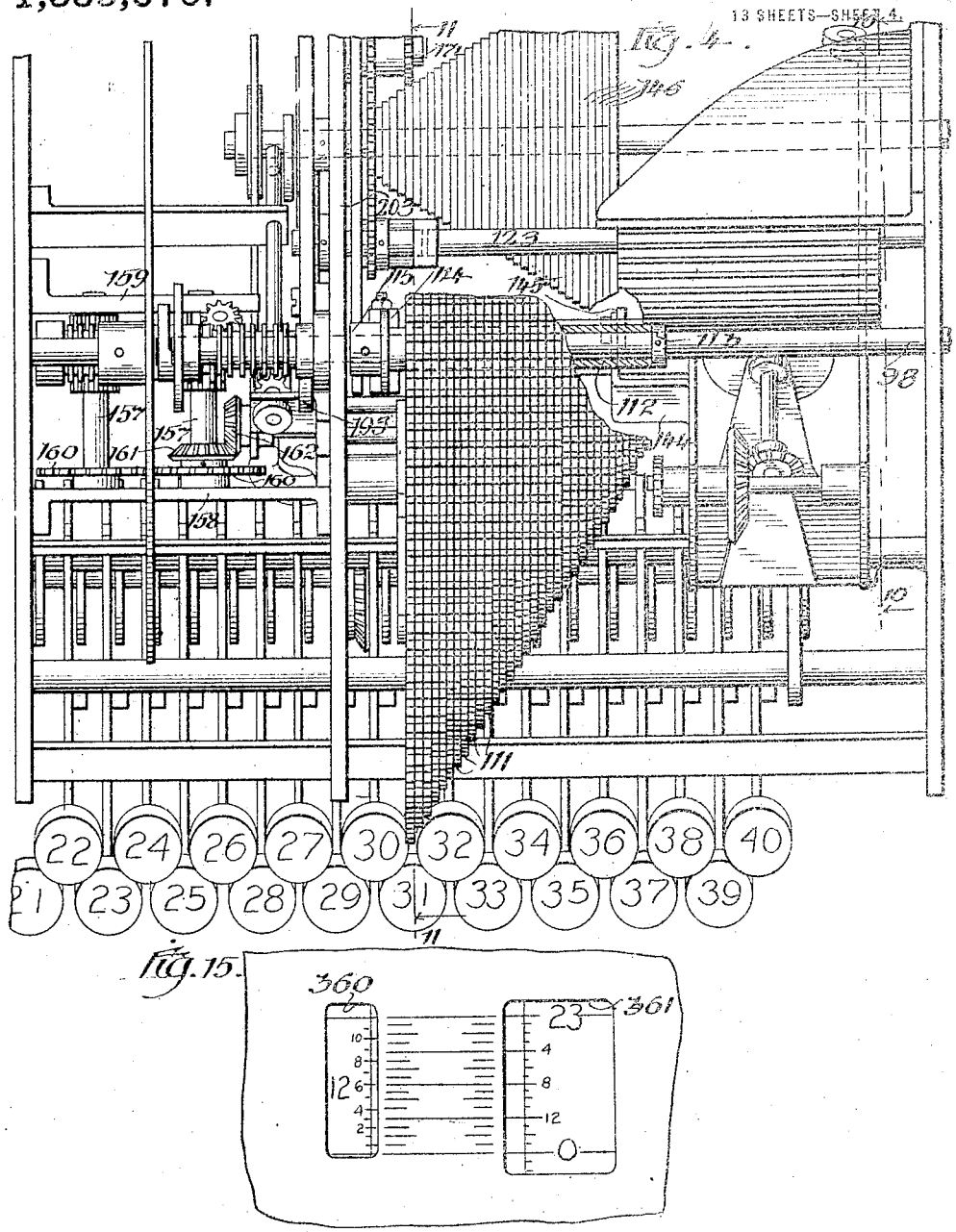

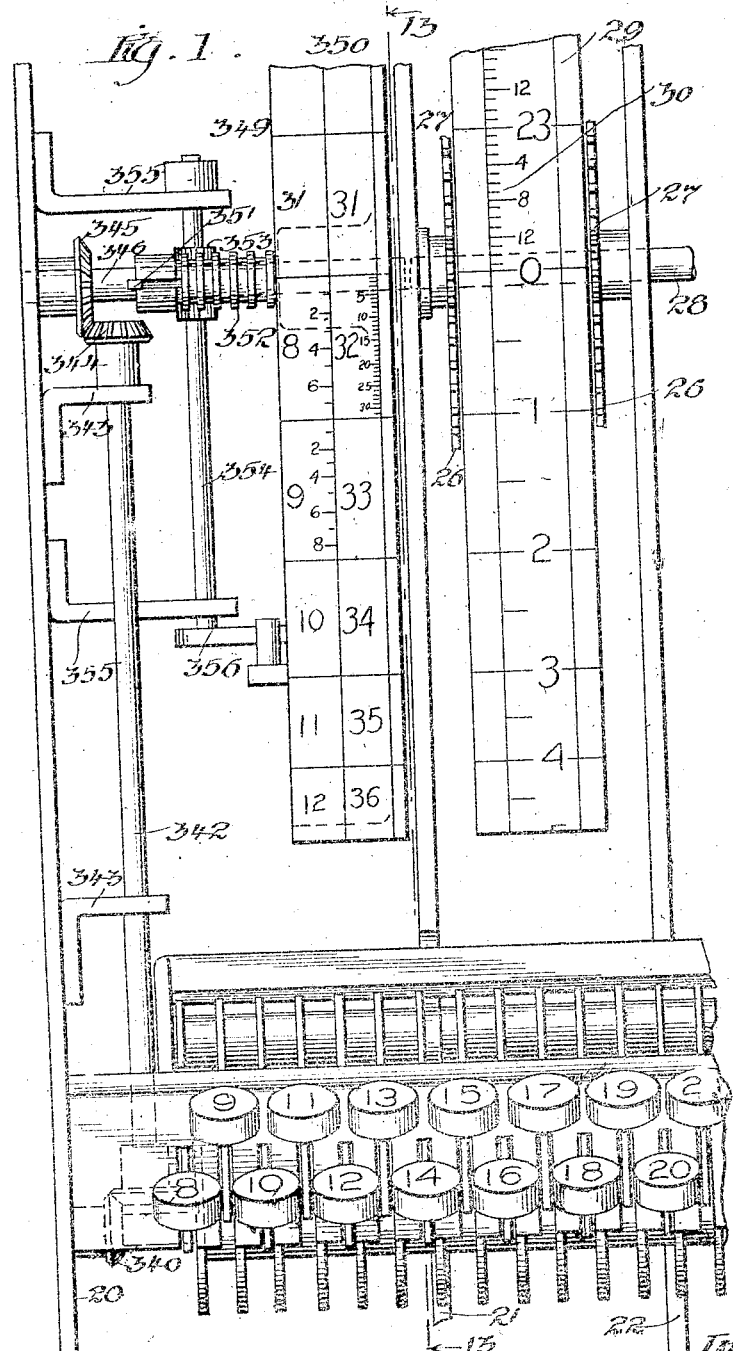

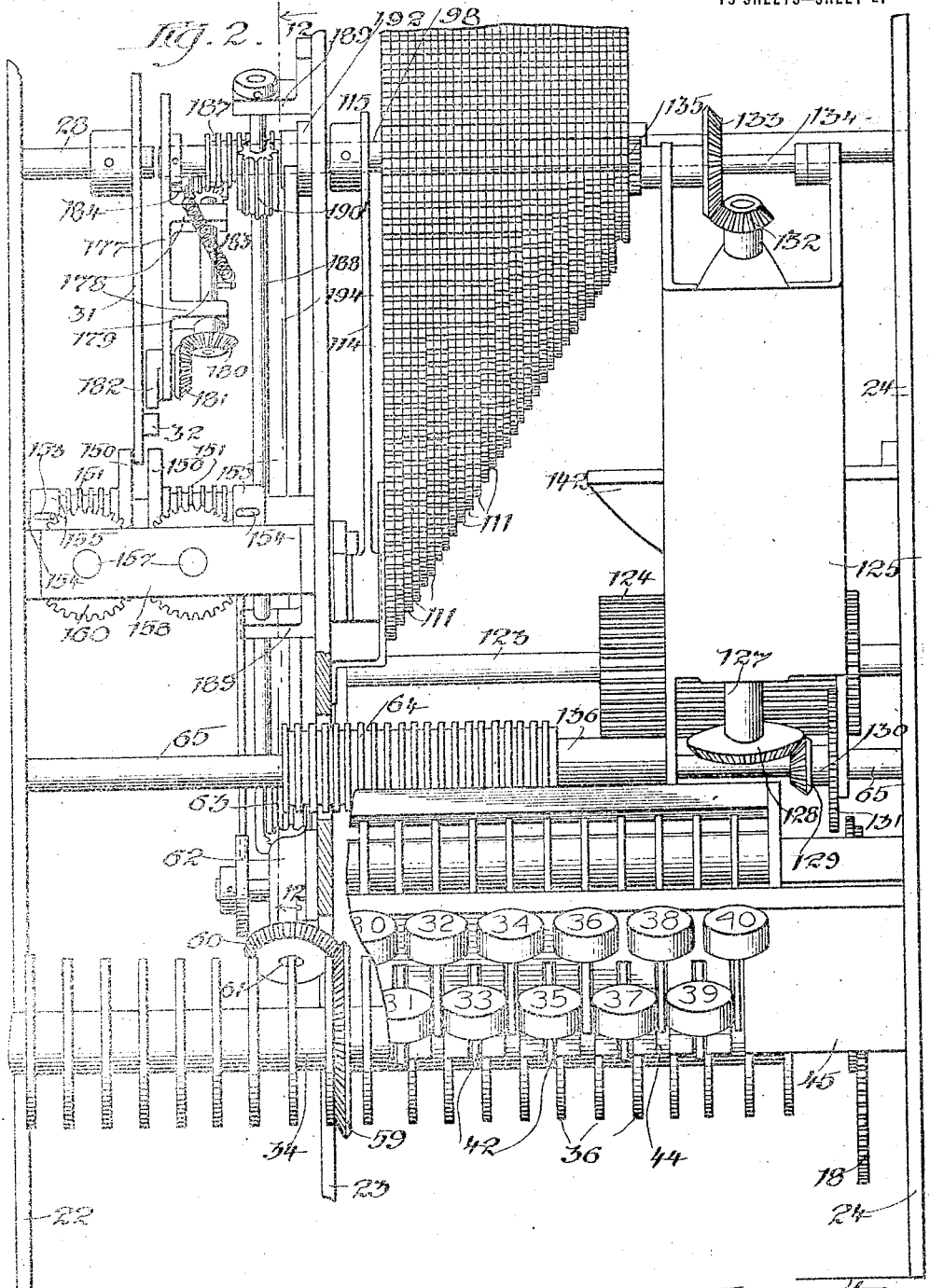

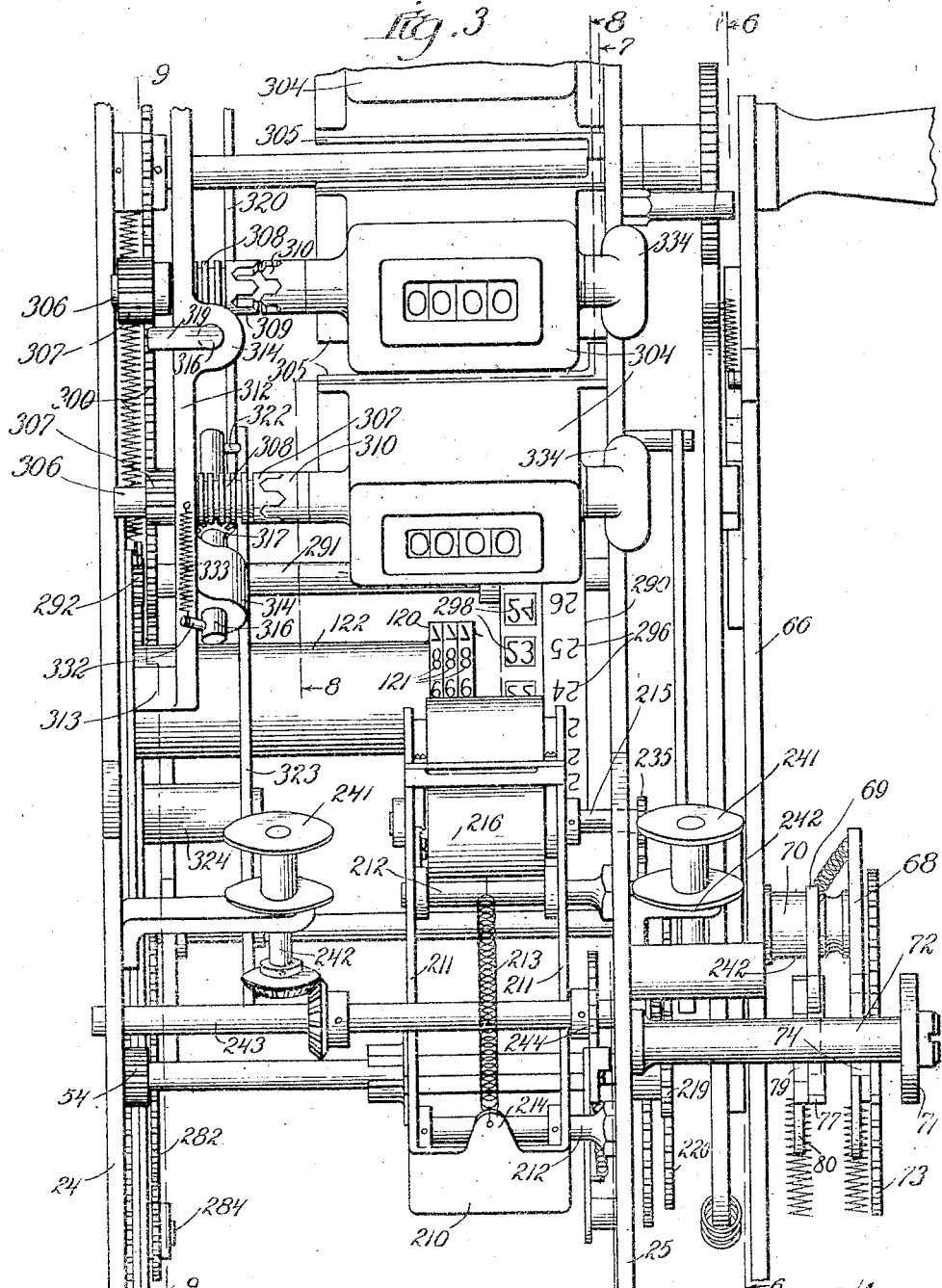

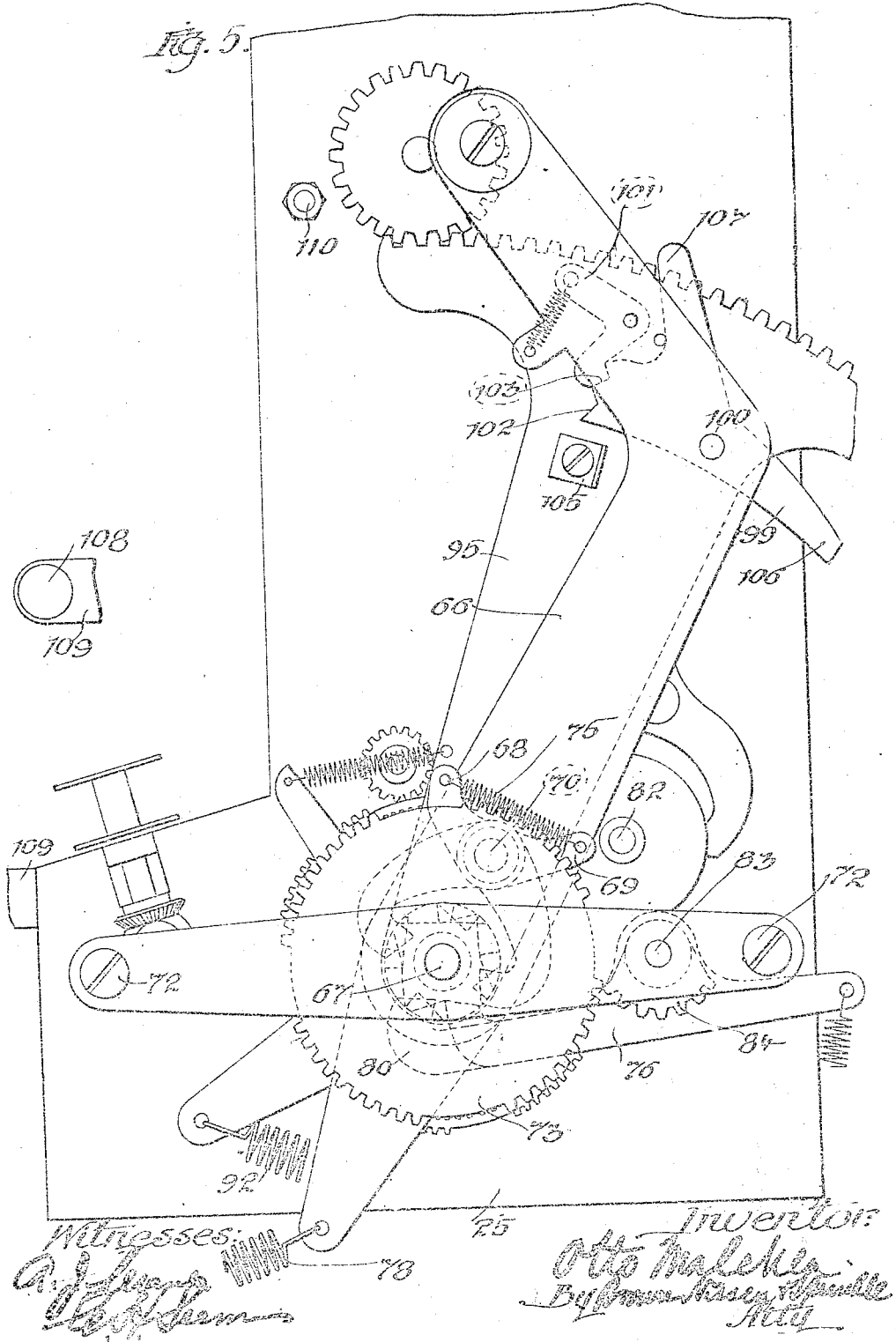

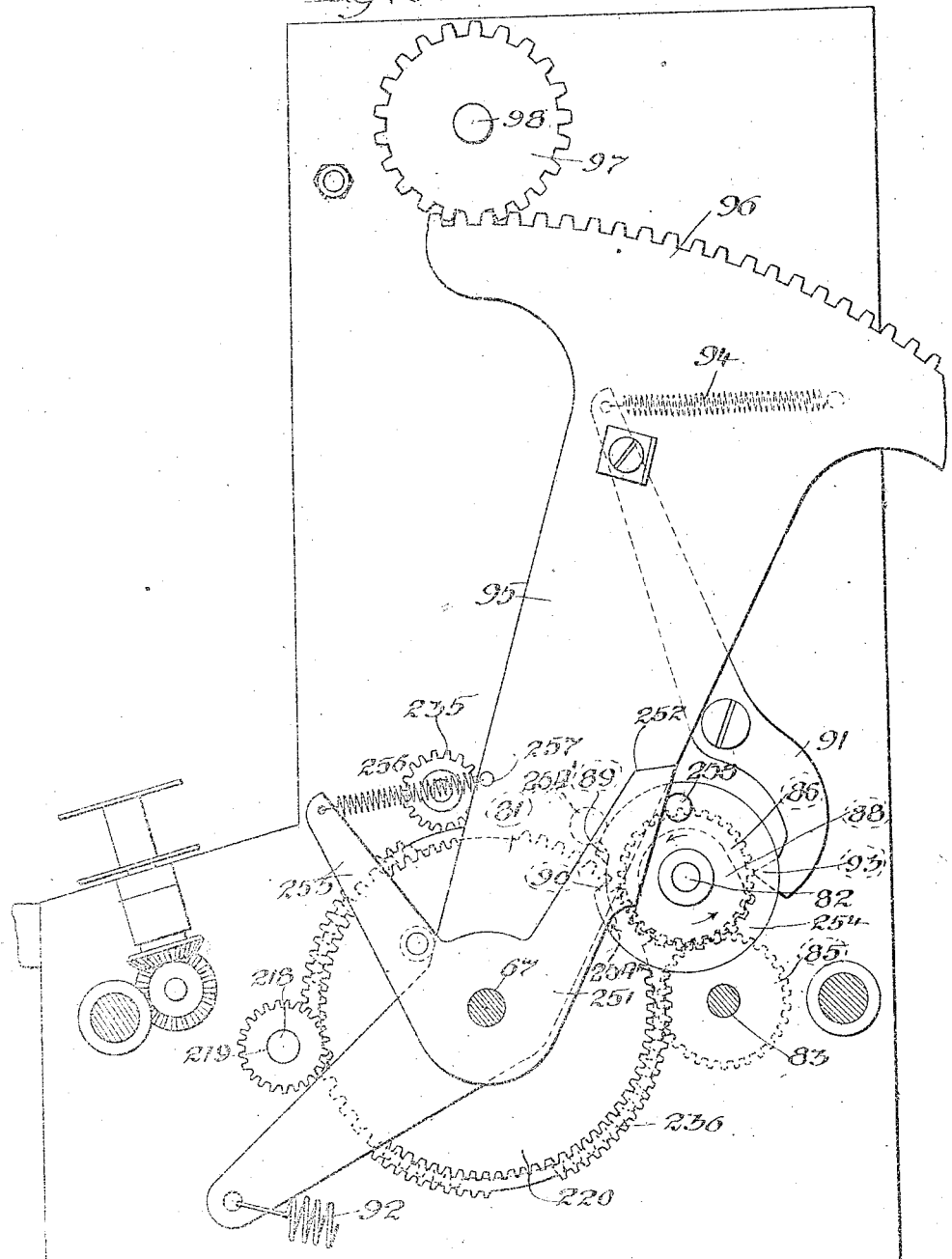

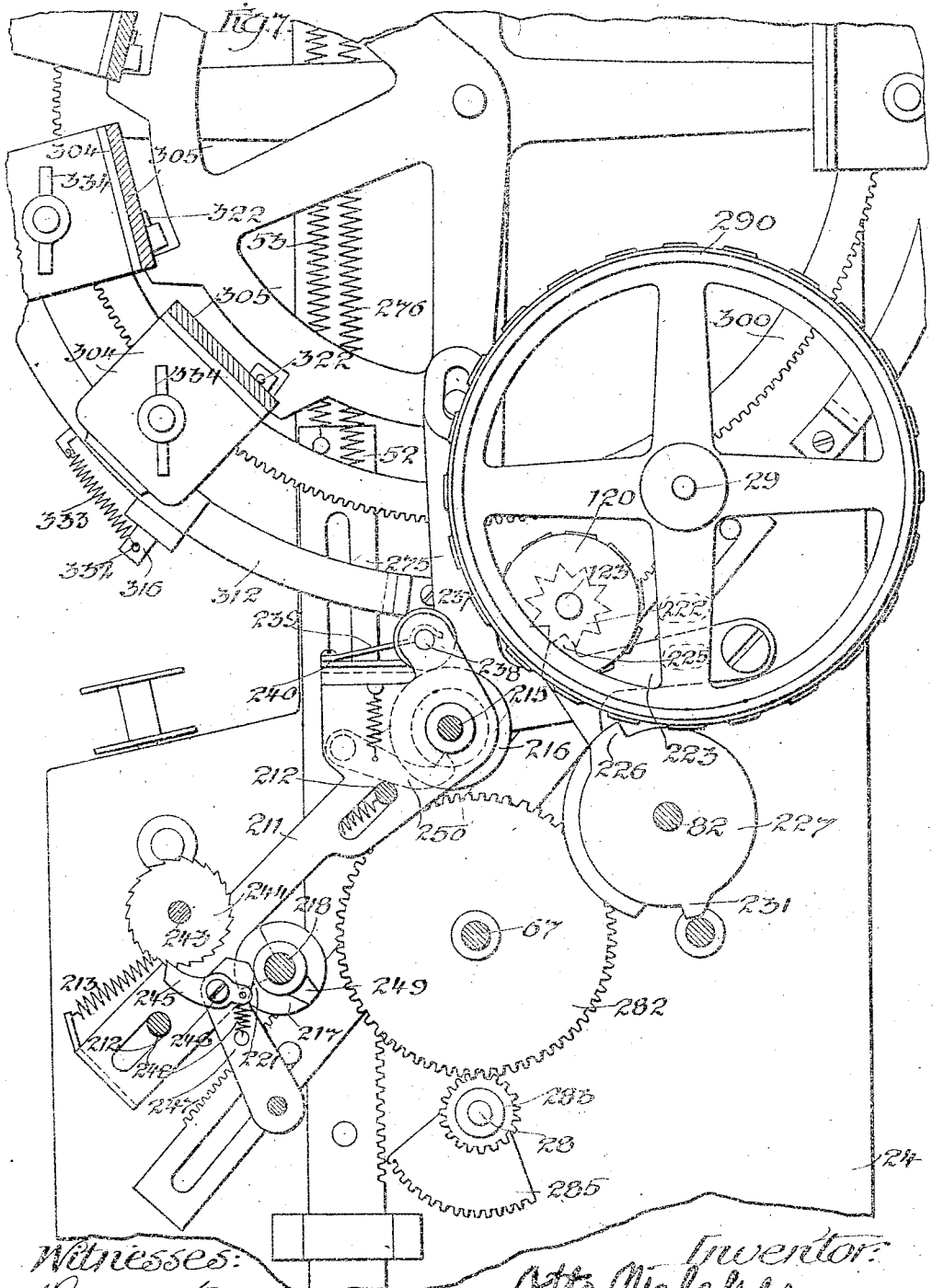

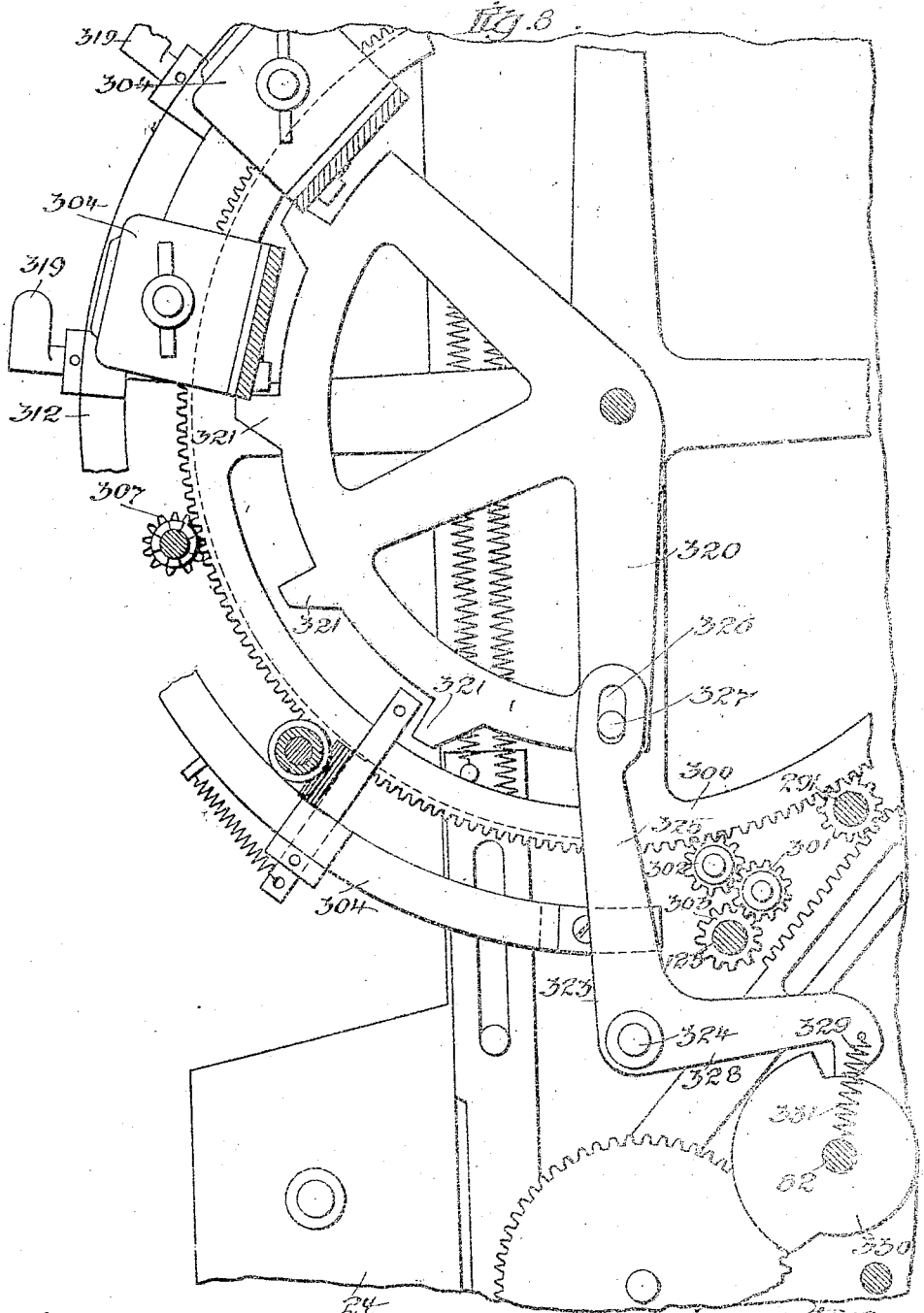

O. MALCHER.
COMPUTING AND PRINTING SCALE.
APPLICATION FILED APR. 6, 1916.
1,335,070.
Patented Mar. 30, 1920.
13 SHEETS—SHEET 9.
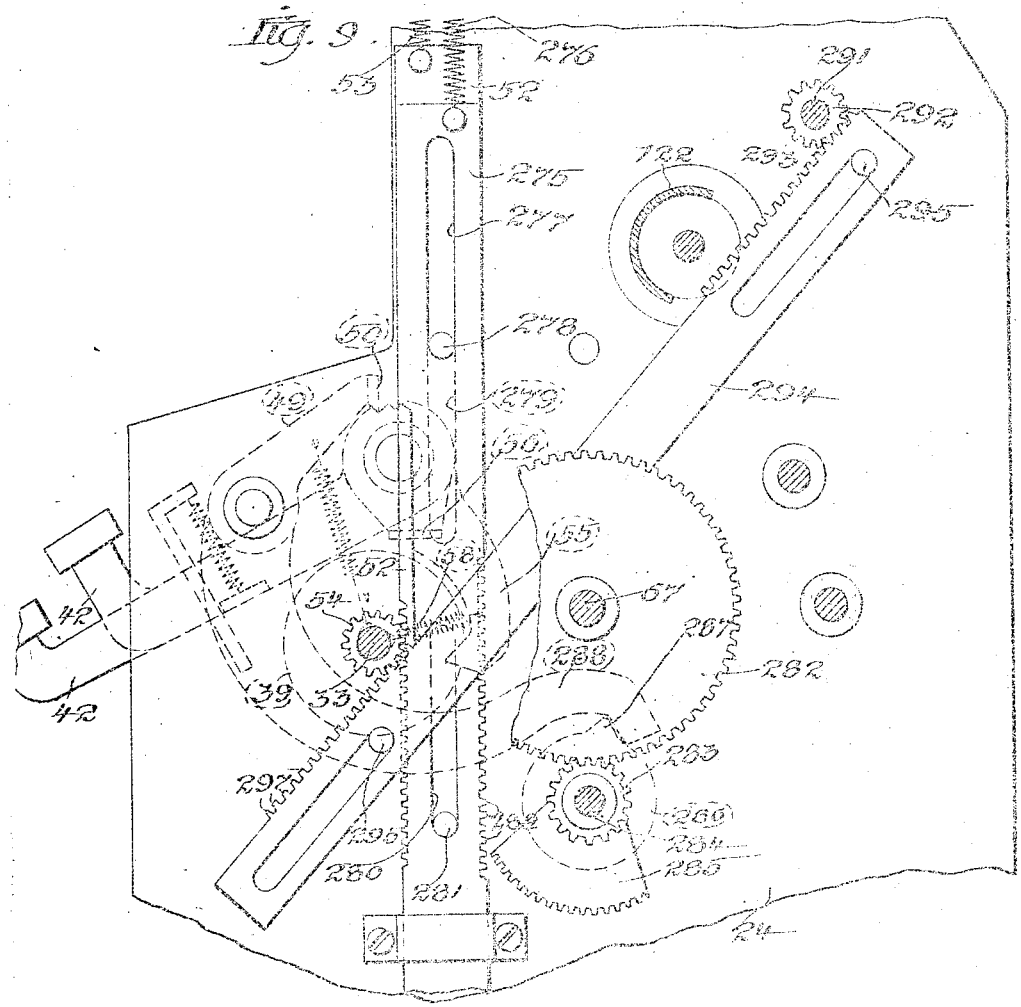
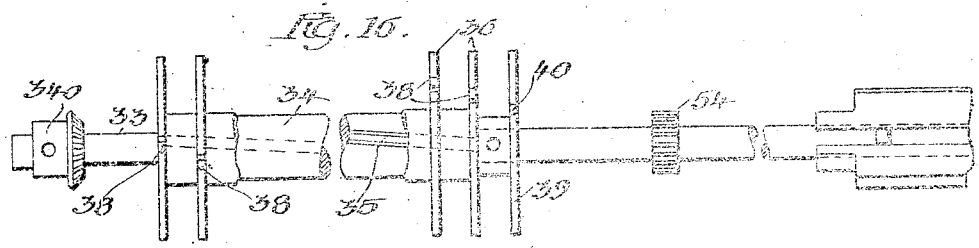

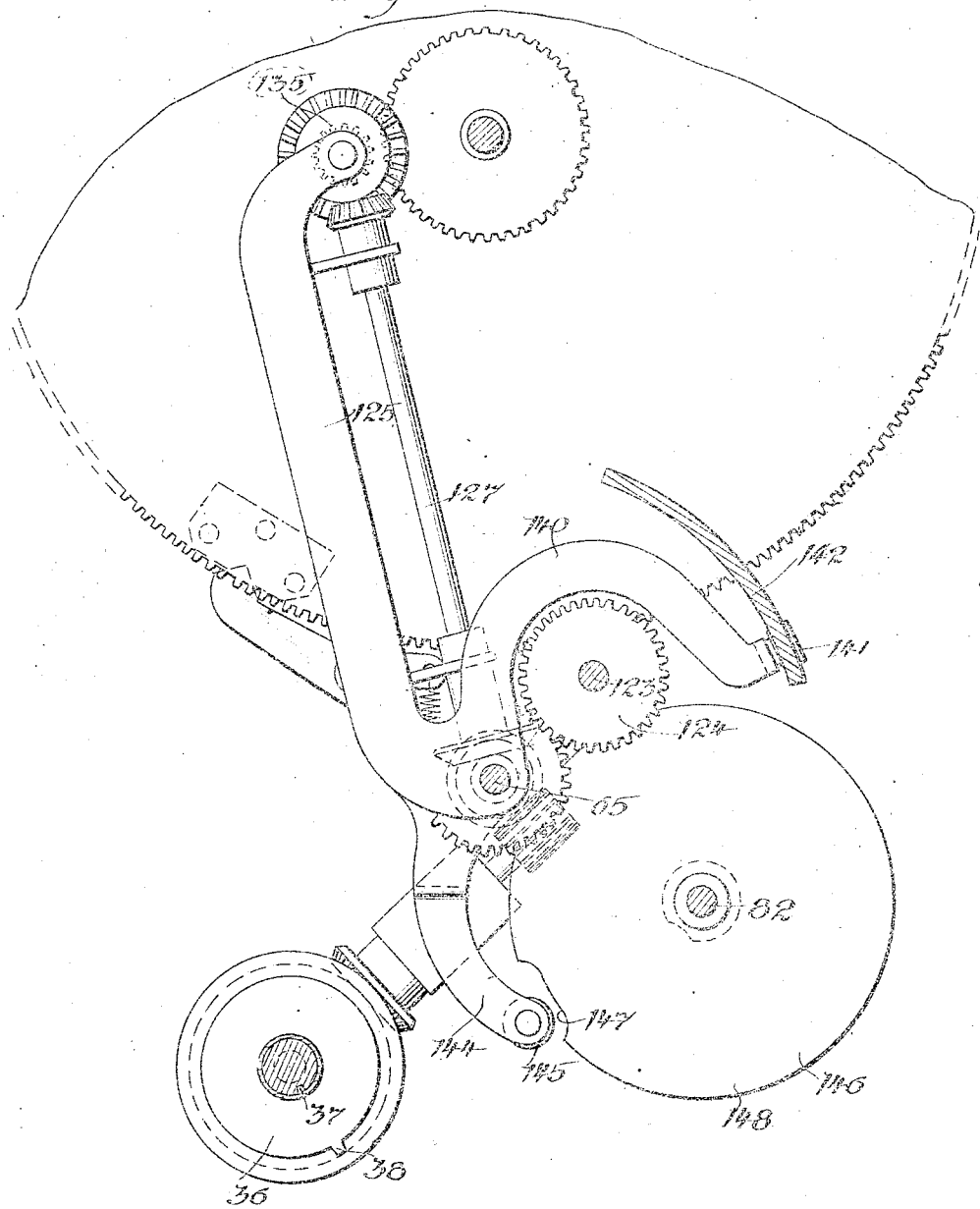

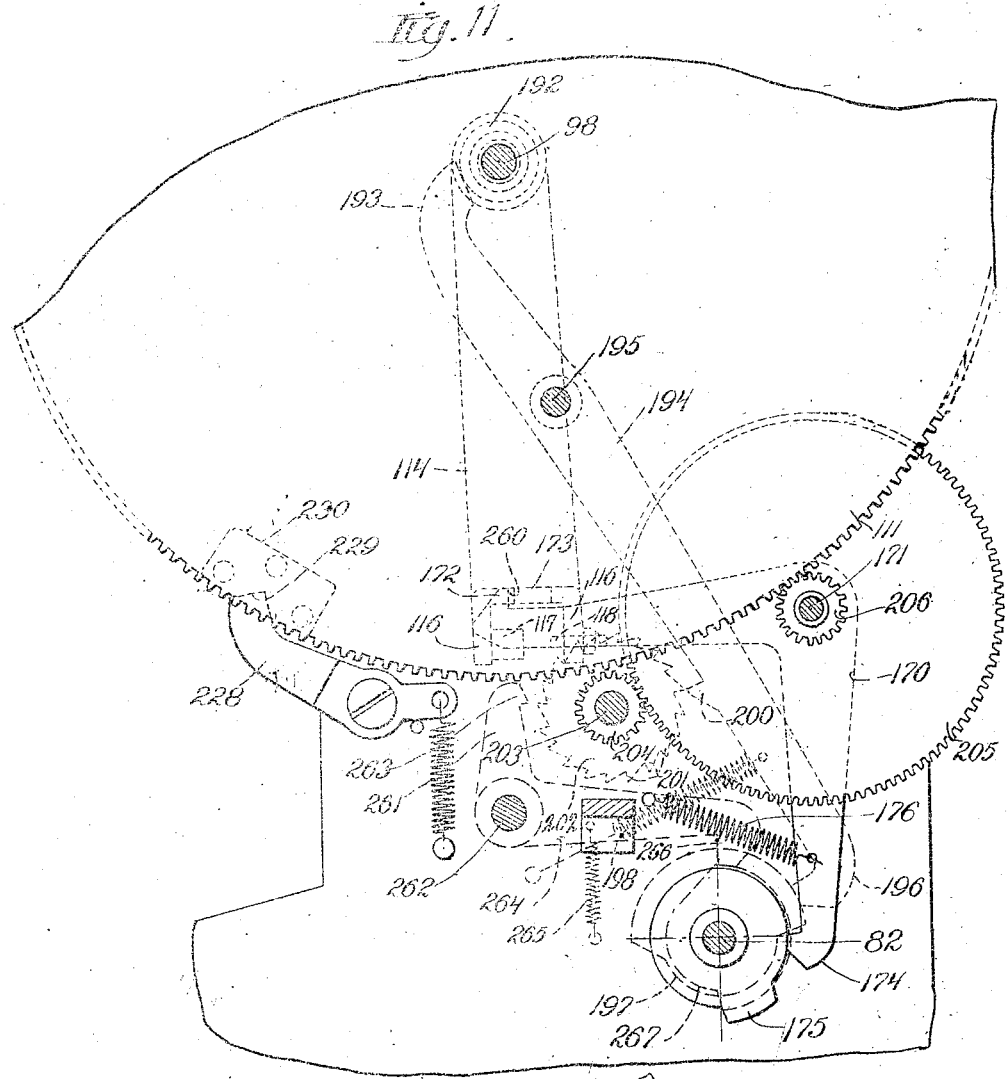
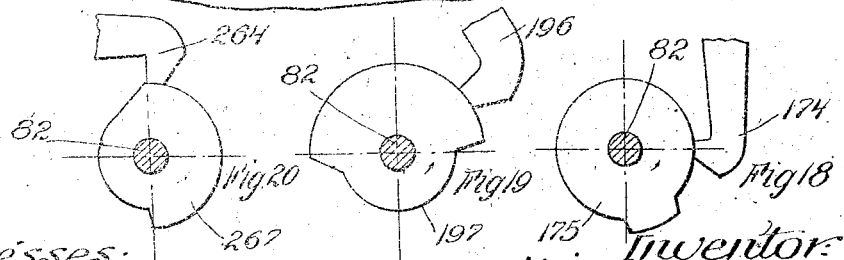

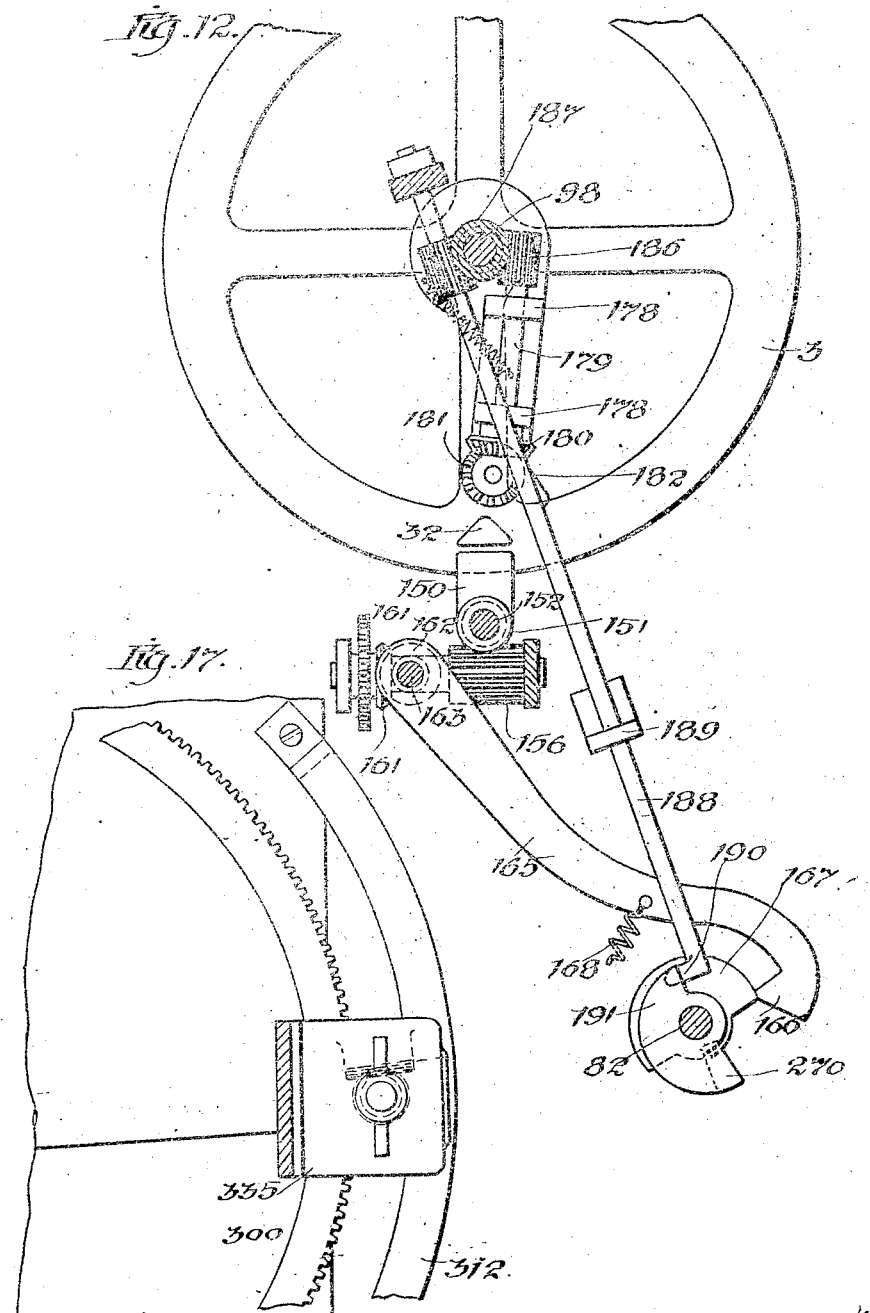

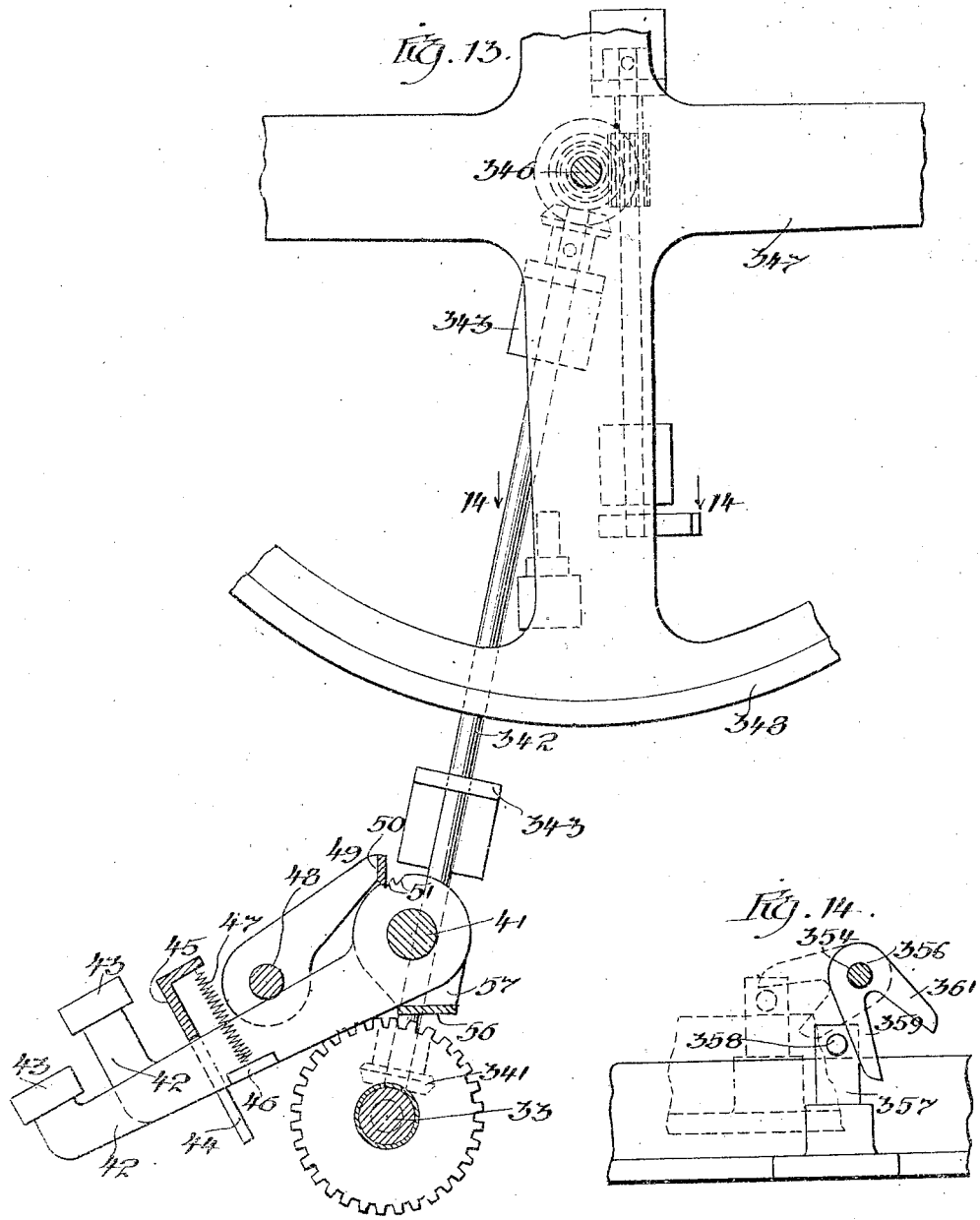

UNITED STATES PATENT OFFICE.

OTTO MALCHER, OF CHICAGO, ILLINOIS, ASSIGNOR TO MALCHER ADDING MACHINE COMPANY, OF CHICAGO, ILLINOIS, A CORPORATION OF ILLINOIS.

COMPUTING AND PRINTING SCALE.

1,335,070.    Specification of Letters Patent.    Patented Mar. 30, 1920.

Application filed April 6, 1916. Serial No. 89,397.

*To all whom it may concern:*

Be it known that I, OTTO MALCHER, a citizen of the United States, residing in Chicago, in the county of Cook and State of Illinois, have invented certain new and useful Improvements in Computing and Printing Scales, of which the following is a specification.

This invention relates to a computing and printing device designed especially for use in connection with weighing scales, and has for its object the improvement and simplification of devices of this character and the provision of a machine that shall practically meet the demands of the trade. The invention is exemplified in the combination and arrangement of parts shown in the accompanying drawings and described in the following specification, and it is more particularly pointed out in the appended claims.

In the drawings, Figure 1 is a fragmentary front elevation of one end of a machine embodying the present invention; Fig. 2 is a fragmentary front elevation of the central portion of the machine partially shown in Fig. 1; Fig. 3 is a fragmentary front elevation of the end of the machine opposite that shown in Fig. 1; Fig. 4 is a fragmentary top plan view with parts broken away of the central portion of the machine shown in Figs. 1, 2 and 3; Fig. 5 is an end elevation looking from the right in Fig. 3; Fig. 6 is a vertical section substantially on line 6—6 of Fig. 3; Fig. 7 is a vertical sectional view substantially on line 7—7 of Fig. 3; Fig. 8 is a vertical sectional view substantially on the broken line 8—8 of Fig. 3; Fig. 9 is a fragmentary vertical sectional view on line 9—9 of Fig. 3; Fig. 10 is a fragmentary vertical sectional view on line 10—10 of Fig. 4. Fig. 11 is a vertical sectional view on line 11—11 of Fig. 4; Fig. 12 is a fragmentary vertical sectional view on line 12—12 of Fig. 2, Fig. 13 is a fragmentary vertical sectional view on line 13—13 of Fig. 1; Fig. 14 is a horizontal sectional view on line 14—14 of Fig. 13; Fig. 15 is a detail of a scale arrangement used in connection with the invention; Fig. 16 is a detail of a portion of the key board mechanism; and Fig. 17 is a fragmentary detail view showing a total value exhibitor used in connection with the invention. Figs. 18, 19, and 20 are details of cam mechanism.

To assist in understanding the operation and relation of the various parts of the machine, a general description of the device as a whole will be given prior to the detailed description of the various parts. The machine is provided with mechanism for computing the value of an article placed upon a scale pan at various prices and for printing the value so computed. The value is ascertained by means of a series of price gears of various sizes, the number of teeth in the different gears being proportional to different prices at which values are computed. A shiftable gear train is arranged for selectively connecting the various price gears to drive a shaft which operates a counter of well known construction. A series of price keys is provided for shifting the gear connection between the price gears and the counter to connect the counter with the gear corresponding to any price desired. In this way, when the price gears are rotated, the counter will be rotated an amount proportional to the price selected. A weight-controlled device is provided for stopping the rotation of the price wheels after they have moved an amount proportional to the weight of an article being sold. In this way, the amount registered by the counter can be made to be proportional to the value of the article being weighed, since the amount registered by the counter depends upon the same factors as the value of the article, namely, the price per pound and the weight of the article. Printing mechanism is provided for taking an impression from the counter after it has been operated and thus recording the value computed. Mechanism is also provided for exhibiting to the customer and others the price per pound, and for printing this price on the same ticket on which the total value is printed. Devices are also provided for ascertaining the total amount of sales for any period of time and the total sales made by different individual salesmen. The invention also includes a device for indicating to a salesman the amount of an article of a given value which may be asked for.

Scale.

As shown in Figs. 1, 2 and 3, the mechanism is carried by a series of upright frame plates, 20, 21, 22, 23, 24 and 25. The weighing device proper may be of any well known and suitable construction and is not shown on the drawings. It is sufficient to say that the device is such that a pair of racks 26 are moved an amount proportional to the weight of an article placed upon a scale pan or other support. These racks mesh with pinions 27 secured to a rotary shaft 28. The shaft 28 is mounted in bearings of suitable construction in the frame members 21 and 22 and carries a scale disk 29 having scale divisions 30 thereon representing pounds and fractions thereof. The only other mechanism carried by the shaft 28 is the scale disk 31 secured rigidly to the shaft to rotate therewith, as shown in Figs. 2 and 12. The disk 31 carries a trip stop 32 secured to one side of its rim and extending laterally a short distance from the face thereof. The disk 31 itself is made of proper proportions to balance the trip stop 32, so that the disk has no tendency to rotate the shaft 28. During the weighing operation, the shaft 28 is entirely free from contact with any of the computing mechanism and hence the weighing operation is not interfered with in any way by this mechanism, which is controlled, in a manner to be described, by the trip stop 32 after the scale disk 31 has come to rest and has been rigidly secured in the position to which it has been turned by the weight on the scale pan.

Keyboard.

The machine is set for computing values at various prices by means of a series of keys corresponding to the different prices for which a particular machine is designed. In the embodiment of the invention shown in the drawings, arrangement is made for computing values at prices from eight to forty cents inclusive. It will be readily seen that the particular prices chosen may be varied to comply with the various requirements of different trades, and are not at all limited to the prices indicated in connection with the embodiment of the machine described. The construction and operation of the key board mechanism will best be understood from Figs. 1, 2, 4, 9, 13 and 16. Mounted for rotation in the frame plates, and extending longitudinally of the machine near the front portion thereof, is a shaft 33 having an enlarged portion 34 provided with a groove 35 arranged spirally therearound. A series of disks 36 (see also Fig. 10) is mounted on the enlarged portion 34, and each disk is provided with an inwardly projecting tooth or key 37 which fits within the groove 35 and holds the disk from rotation on the shaft. Each of the disks 36 is also provided with a peripheral tooth 38 in radial alinement with the tooth 37. It will be readily seen that when the disks are all assembled on the shaft 33, the teeth 38 will be angularly displaced from one another, forming a spiral extending around the shaft. A disk 39 is secured to the shaft at the right of the series of disks 36 as viewed in the drawings, and is provided with a notch 40 for a purpose to be described. A second shaft 41 extends longitudinally of the machine in parallelism with the shaft 33 and somewhat above that shaft, as shown in Fig. 13. Pivotally mounted on the shaft 41, is a plurality of keys 42 each provided with a finger piece 43. The keys 42 pass through slots 44 in a guide plate or comb 45 positioned at the front of the machine. Each key 42 has a lock or projection 46 extending from the side thereof in position to intercept a tooth 38 on one of the disks 36 when the key is depressed. Coil springs 47 are arranged to hold the keys in their uppermost position. The upward movement of the keys 42 is limited by a shaft 48 extending longitudinally of the machine above the bank of keys. Mounted for pivotal movement on the shaft 48, is a pair of arms 49 carrying a universal lock bar 50 arranged to coöperate with notches 51 in the keys 42 to hold the keys in position when depressed.

Mechanism shown best in Fig. 9 is provided for rotating the shaft 33 in a counterclockwise direction, as viewed in that figure, and comprises a rack bar 52 having a spring 53 attached thereto and normally tending to draw the bar in an upward direction. A pinion 54 is secured to the shaft 33 in position to mesh with the rack 52. The shaft 33 and pinion 54 are held from rotation under the influence of the spring 53 by a detent 55 which engages the notch 40 in the disk 39. The detent 55 is rigidly secured to a universal bar 56 which extends longitudinally of the machine beneath the key 42, and which is pivotally supported by upturned ends 57, as shown in Fig. 13, from the shaft 41. A coil spring 58 normally draws the detent 55 into contact with the periphery of the disk 39. From this arrangement it will be seen that when any one of the keys 42 is depressed, the projection 46 on the side of the key will first be brought into proximity with the periphery of the disk 36 corresponding to the particular key depressed, and during the movement of the key to bring the projection into this position, the bar 56 will be moved about the shaft 41, carrying with it the detent 55. When the key has been moved a sufficient amount to bring the projection 46 into operative position, the detent 55 will be freed from the notch in the disk 39 and the shaft 33 will then be rotated by means of the rack 52 under the influence of the spring 53. Since the teeth 38 on the disks 36 occupy different angular positions relative to the shaft 33, the amount of rotation of the shaft will depend upon the particular key depressed, and will be proportional to the price represented by that key.

As shown in Fig. 2, the enlarged portion 34 of the shaft 33 is provided with a beveled gear 59 which meshes with a beveled pinion 60 carried on a shaft 61 which is rotatably mounted in a bearing 62 secured to the frame plate 23. The end of the shaft 61 opposite the pinion 60 has a spur pinion 63 which meshes with a cylindrical rack 64 mounted for free movement on a shaft 65 supported by the frame members of the machine and extending in a direction parallel with the shaft 33. By the train of gearing described, the rack 64 is moved along the shaft 65 an amount proportional to the amount of rotation of the shaft 33 whenever one of the keys 42 is depressed, and since the shaft 33 rotates an amount proportional to the price represented by the depressed key, the movement of the rack 64 will also correspond to the price represented by the depressed key. The movement of the rack 64 controls the connection between the price gears and the counter or register, as will appear later.

Operating handle.

The computing mechanism is driven by a handle lever 66, the operation of which will best be understood from Figs. 3, 5 and 6. The lever 66 is mounted for rotation on a shaft 67 and carries a pair of clutch dogs 68 and 69 pivotally mounted on a stud 70 secured to one side of the handle lever 66. The shaft 67 is mounted for rotation in the frame members 24 and 25 and is supported at its outer end by the cross bar 71 carried on supporting pins 72. Mounted for rotation on the shaft 67, adjacent the bar 71, is a mutilated gear 73 which has secured thereto a ratchet wheel 74 arranged to be driven by the clutch dog 68. The dog 68 is resiliently held in contact with the ratchet 74 by a spiral spring 75 connecting the upper end of the dog 68 with the upper end of the other dog 69. The parts are so related that when the handle 66 is drawn forwardly or to the left in Fig. 5, the ratchet wheel 74 and the gear 73 will be given a quarter of a revolution. A spring pressed detent 76 coöperates with the ratchet wheel 74 to prevent retrograde movement thereof. The clutch dog 69 coöperates with a ratchet wheel 77 similar to the wheel 74 but secured to the shaft 67 and having its teeth arranged to drive the shaft 67 in a clockwise direction, as seen in Fig. 5, on the return stroke of the handle lever 66. In other words the handle 66 and oppositely arranged pawls 68 and 69 constitute a double acting ratchet mechanism arranged to give the mutilated gear 73 a quarter turn during the forward stroke of the handle and to give the shaft 67 on which the gear 73 is loosely mounted a quarter turn in the reverse direction on the return stroke of the handle. The lever 66 is provided at its lower end with a spring 78 by which it is returned to its original position after it has been drawn forward by the operator and released. Adjacent the ratchet 77 and secured thereto is a second ratchet wheel 79 which coöperates with a holding dog 80 for holding the shaft 67 from backward movement. The shaft 67 is rotated a quarter of a revolution at each operation of the handle. A mutilated gear 81 similar to the gear 73, is carried on the shaft 67 at the end thereof opposite the gear 73. A cam shaft 82 is mounted in the frame members 24 and 25 above and to the right of the shaft 67, as viewed in Fig. 6. A shaft 83 is located below the cam shaft 82 and carries a gear segment 84 in position to mesh with the mutilated gear 73. The shaft 83 is provided with a spur gear 85 which meshes with a similar spur gear 86 secured to the cam shaft 82. When the mutilated gear 73 is rotated during the forward movement of the handle 66 it meshes with the quadrant 84 and rotates the shaft 83 a half revolution in a clockwise direction, as viewed in Fig. 5. This motion is transmitted through the gears 85 and 86 to the cam shaft 82, which is in turn rotated a half revolution in a counter-clockwise direction. During the return stroke of the handle, the mutilated gear 81 meshes with a gear segment 88 carried directly on the cam shaft 82, and imparts a second half turn to the cam shaft in the same direction as that imparted to it by the gear wheel 85 during the forward movement of the operating handle. The cam shaft 82 is provided with a disk 89 secured thereto, having notches 90 at opposite sides thereof. A detent 91 is pivoted on the frame plate 25 and is provided with a beveled point 93 for contacting with the notches 90 on the disk 89 to hold the cam shaft 82 in position after each half revolution of the shaft. A spring 94 presses the detent 91 resiliently into contact with the periphery of the disk 89. By the mechanism described, the cam shaft 82 which carries a series of cams to be described, for controlling the various mechanism of the computing machine, is given a complete revolution each time the handle 66 is operated, the shaft being moved through half a turn during the forward stroke of the handle and through the remaining half of a complete revolution during the return stroke of the handle.

Mounted for rotation on the shaft 67 adjacent the handle 66, as shown in Figs. 3, 5 and 6, is an arm 95 carrying a rack segment 96 at its outer end. The arm 95 is provided with a downwardly projecting tail piece provided with a coil spring 92 normally tending to rotate the arm in a counterclockwise direction, as viewed in Fig. 6. A catch, to be described, normally holds the arm 95 in position shown in Fig. 6, and this catch is releasable by mechanism to be described, to permit the arm to rotate under the influence of the spring 92. The rack 96 meshes with a spur gear 97 secured to a shaft 98 rotatably mounted in the upper portion of the machine frame. A series of price gears to be described, are carried on the shaft 98 and are rotated in a manner to be described, by the arm 95 and the rack 96. The operation handle 66 has a dog 99 pivotally mounted at 100 thereon. The dog 99 has a resiliently pressed detent 101 arranged to coöperate with notches 102 and 103 in a portion of the dog to hold the dog releasably in two different positions. A stop plate 105 is secured to the arm 95 and projects into the plane of the dog 99. When the detent 101 is in engagement with the upper notch 103, the nose 106 of the dog 99 is raised above the stop 105 and passes the stop freely when the handle 66 is operated. This is the position in which the dog is held during the forward stroke of the handle 66. When the operating lever 66 has been moved to its extreme forward position, an upwardly projecting finger 107 carried by the dog 99 strikes an operating pin 108 carried on an arm 109 projecting from the frame member 25. For convenience of illustration, the arm 109 is broken away as seen in Fig. 5, and the operating pin 108 is moved out of its proper position relative to the rest of the machine. When the finger 107 strikes the pin 108, the notch 102 is moved upwardly into contact with the detent 101 and the nose of the dog 106 is swung downward and into position to engage the stop plate 105 on the arm 95 when the handle 66 is returned to its original position under the influence of the spring 78. The spring 78 is made sufficiently strong to overcome the tension of the spring 92 and to carry the arm 95 backwardly with the arm 66 from whatever position the arm 95 may occupy. A second operating pin 110 projects from the face of frame member 25 into the plane of movement of the finger 107 and in a proper position vertically to engage this finger during the return movement of the handle 66 when the finger is held in its uppermost position by the detent 101. During the forward movement of the handle, the finger 107 clears the pin 110 since the finger is then held in its lower position. When the finger 107 strikes the pin 110 on the return stroke of the handle 66, the nose of the dog 106 will be forced upwardly out of contact with the stop plate 105 and the arm 95 will be left in the position shown in Fig. 5, the handle 66 continuing its movement to the right of that position and to the end of its stroke. Catch mechanism to be described, secures the arm 95 in its returned position and holds the arm against the tension of the spring 92.

Price gears.

The price gears for driving the counter amounts proportional to the various prices at which the machine is set to operate, are best shown in Figs. 2 and 4. These gears are designated by the numeral 111 and are graduated in size as indicated in the figures referred to, the number of teeth in each gear being proportional to the particular price per pound which the gear represents. The exact number of teeth in the different gears is not an essential feature of the invention, but it has been found that convenient proportions are produced by providing one tooth on each price gear for each three cents' worth of value which the gear is designed to compute at the price it represents. As an illustration, the largest gear represents the price of forty cents per pound, and since the scale shown in the illustration is designed for articles weighing up to twenty-four pounds, the highest value to be computed by the largest price gear is the value of twenty-four pounds at forty cents per pound, or $9.60. This gear is therefore conveniently provided with three hundred and twenty teeth or one tooth for each three cents' worth of the highest value computed by it. The other gears are provided with proportional numbers of teeth there being a difference of eight teeth between each two adjacent gears in the particular design shown in the drawings. The gears are rigidly secured together and are carried on a sleeve 112 rotatably mounted on the shaft 98 but held from longitudinal movement on the shaft by a collar 113. An arm 114 is rigidly secured to the shaft 98 by means of a collar 115 in a position adjacent the face of the largest gear 111. The arm 114, as shown in Fig. 11, is bifurcated at its outer end, the forks 116 of the bifurcation inclosing a lug 117 secured to the face of the larger gear 111. The opening between the arms 116 may be adjusted by a set screw 118 carried by one of the arms. By this arrangement the price gears 111 may be rotated with the shaft 98, but a certain amount of lost motion is permitted between the shaft and the price gears.

Counter.

The register or counter on which computed values are set up and from which they are recorded, is indicated at 120 in Fig. 3. This counter is of well known construction and is provided with a plurality of number wheels or disks 121 arranged side by side and representing the decimal orders of the numbers set up in the counter. The counter is carried in a hollow cylindrical supporting member 122 and is driven by a shaft 123 to which the units disk is secured. Each disk of the counter is provided with numerals from zero to nine, making ten places in all represented upon the periphery of the counter. Each revolution of the shaft 123 will therefore represent a movement corresponding to ten units in the counter, or will move the counter an amount to register ten cents. Mechanism is provided in counters of this kind for rotating each disk above the units disk one-tenth of a revolution for each complete revolution of the disk of the next lower order. The counter having three disks like that shown in the drawing, is therefore capable of registering numbers up to 999.

*Shiftable gear train.*

The shaft 123, as shown in Fig. 2, is provided with a gear drum 124 having teeth extending longitudinally of the drum on the periphery thereof. In order that the counter 120 may be operatively connected with the various price gears 111, a shiftable gear train is provided, which is shown best in Figs. 2, 10 and 11. A gear frame 125 is mounted to move freely on the shaft 65, and carries a shaft 127 held in an upright position in the frame. The lower end of the shaft 127 is provided with a beveled gear 128 which meshes with a beveled pinion 129 mounted for sliding and rotary movement on the shaft 65. The pinion 129 has secured thereto by a collar 130, a spur gear 131 which meshes with the teeth on the gear drum 124. By this arrangement driving connection is maintained between the drum 124 and the shaft 127 regardless of the position of the frame 125 on the shaft 65. The upper end of the shaft 127 carries a beveled pinion 132. The pinion 132 meshes with a gear 133 rigidly secured to a shaft 134 mounted for rotation in the upper end of the frame 125. The shaft 134 projects slightly at the left of the frame 125, as viewed in Fig. 2, and carries a spur pinion 135 in position to be moved into mesh with the price gears 111. The lower portion of the frame 125 is connected by a sleeve 136 with the circular rack 64. This rack, as previously explained, is moved longitudinally along the shaft 65 by the key shaft 33, the amounts of movement corresponding to a particular price key depressed. The rack 64 carries with it the frame 125 and the parts are so related that the pinion 135 is moved to a position opposite a particular price gear corresponding to any particular key which is depressed.

As shown in Fig. 10, the gear frame 125 has an arm 140 carried on its lower portion and provided with a cam roller 141 arranged to coöperate with a cam guide 142 secured to the frame member 24. The cam guide 142 is provided with a track 143 at one edge thereof against which the roller 141 bears to hold the frame 125 in proper relation with the price gears 111. The shape of the track 143 is such that the pinion 135 is held a uniform distance from the peripheries of the price keys 111 at the various positions of the frame 125 longitudinally of the shaft 65. The frame 125 is provided at its lower end with a second arm or tail piece 144 which carries a cam roller 145 in position to mesh with cams 146 on the shaft 82. As shown in Fig. 10, the roller 145 and the pinion 135 are both spaced slightly from their coöperating members when the cam roller 141 is in contact with the cam track 143 and when the roller 145 is opposite the depressed portion 147 on the cam disk 146. When the cam disk 146 is rotated to bring the extended portion 148 of its periphery into contact with the roller 145, the tail piece 144 will be moved to the left in Fig. 10, and the pinion 135 will be moved into mesh with the particular price gear opposite which it is positioned. It will be seen from Fig. 4 that the cam disks 146 are graduated in size to correspond to the different diameters of the price gears 111, so that the cam roller 145 will be provided with a cam disk 146 of proper size to coöperate therewith regardless of the position of the frame 125 on the shaft 65.

*Clutch for scale disk.*

In order that an operative relation may be established between the weight-operated scale and the computing mechanism, mechanism is provided for holding the weight-operated disk 31 rigidly against movement after it has been adjusted by a weight on the scale pan. This holding mechanism must be such that no strain will be brought to bear upon the bearings of the scale proper, since these bearings must be delicately made. To accomplish this end, a pair of clamping jaws 150 are positioned on opposite sides of the disk 31, as shown in Figs. 2 and 12. The jaws 150 are secured to circular racks 151 mounted for sliding movement on a shaft 152 carried between the frame plates 22 and 23. The jaws 150 are prevented from rotation on the shaft by pins 153 operating in slots 154 formed in sleeves 155 secured to the racks 151. A pair of spurs pinions 156 mesh with the racks 151 and are rigidly secured to shafts 157 rotatably carried in supports 158 and 159 secured to the machine frame (see also Fig. 4). The shafts 157 are provided with a pair of meshing spur gears 160 which cause the shafts to rotate in unison. One of the shafts 157 is provided with a pinion 161 which meshes with a pinion 162 carried on a stud shaft 163 supported by the frame member 23. The pinion 162 has rigidly secured thereto a lever arm 165 provided at its end with a contact point 166 coöperating with a cam disk 167 carried on the cam shaft 82. A coiled spring 168 normally draws the lever 165 toward the shaft 82, forcing the contact point 166 into contact with the disk 167. It will be seen from Fig. 12 that the cam disk 167 is so proportioned that on a very slight rotation of the shaft 82 the contact point 166 will be released to permit movement of the lever 165 under the influence of the spring 168. When this occurs, the gear 162 will cause rotation of the two shafts 157 and force the clamping jaws 150 toward one another to clamp the disk 131 between the two jaws, thus securing the disk against movement independently of the bearings of the shaft 28. Since the cam shaft 82 begins rotation with the beginning of the movement of the operating handle 66, this clamping of the disk 31 will be the first result brought about by the movement of the operating handle. Since the handle is operated after the article has been placed upon the scale pan, the disk will be clamped in the position to which it has been moved by the weight of the article and the trip stop 32 will be displaced from its zero position an amount proportional to the weight of an article on the scale pan.

*Price gear control.*

In order that the amount of movement of the counter as driven by the price gears may be proportional not only to the price per pound of the key depressed, but also to the weight of the article upon the scale pan, means is provided for stopping the rotation of the price gears after they have moved through an angle equal to the angle of displacement of the trip stop 32 by the weight on the pan. This control mechanism will best be understood by reference to Figs. 2, 11 and 12. The price gears are rotated, as previously explained, from the shaft 98 by means of the bifurcated arm 114, and the shaft 98 in turn is rotated by the rack 96 carried on the arm 95 shown in Fig. 6. The spring 92 normally tends to move the rack 96 to rotate the shaft 98 and this shaft is held against rotation by an angular shaped lever 170 pivotally supported on a shaft 171 (Fig. 11), and provided with a catch 172 which contacts with a projecting lug 173 on the arm 114. The lower arm of the angle lever 170 is provided with a contact member 174 which bears upon a cam disk 175 carried on the shaft 82. The cam disk 175 is properly proportioned to move the lever 170 to release the catch 172 to permit rotation of the shaft 98, and the cam gears carried thereon at the proper period in the operation of the machine, as will be explained. A coil spring 176 holds contact member 174 resiliently against the periphery of the cam disk 175. Secured to the end of the shaft 98, adjacent the scale disk 31, as shown in Figs. 2 and 12, is an arm 177 provided with bearing lugs 178 in which a shaft 179 is rotatably mounted. At its outer end shaft 179 carries a beveled pinion 180 meshing with a beveled pinion 181 mounted for rotation on the end of the arm 177. Secured to the pinion 181 for rotation therewith, is a contact member 182 arranged to coöperate with the trip stop 130 on the scale disk 31. A coil spring 183 attached to pins 184 and 185 normally tends to rotate the shaft 179 in a direction to move the contact member 182 in a clockwise direction, as viewed in Fig. 12, to cause the member to assume an extended position in the path of movement of the trip stop 32. The shaft 179 carries at its inner end a spur gear 186 which meshes with a cylindrical rack 187 slidably mounted on the shaft 98. A rod 188 is journaled in bearing lugs 189 secured to the frame member 23 and carries a spur pinion 190' at its upper end in position to mesh with the cylindrical rack 187. The spring 183 normally tends to move the rack 187 to the left in Fig. 2 and thus to rotate the rod 188 about its axis. The rod is prevented from rotation as shown in Fig. 12, by an angular finger 190 which bears against the lateral surface of a cam disk 191 carried on the cam shaft 82. The cam disk 191 is so proportioned that it will move out of contact with the finger 190 shortly after the release of the lever 165 by the cam 167. When the finger 190 is released, the shaft 179 will be permitted to rotate under the influence of the spring 183, moving the contact member 182 into extended position and sliding the rack 187 along the shaft 28 to the left, as seen in Fig. 2. Secured to the rack 187 is a slip ring or bearing disk 192 formed with a continuous circular periphery arranged to coöperate with the contact end 192 of a lever 194 pivoted at 195 to the frame member 23 (Fig. 11). The lower end of the lever 194 is provided with a contact member 196 which bears against the periphery of a cam disk 197 carried on the cam shaft 82. A comparatively stiff coil spring 198 is attached to the lever 194 and draws the end 196 thereof into contact with the cam 197. The cam 197 is so shaped that the end 193 is held out of the path of movement of the disk 192 at the time that the rack 187 moves the disk along the shaft 28. This movement of the rack brings the disk 197 in alinement with the lever 194 and beneath the contact end 193 thereof. Immediately after this occurs, the contact point 196 of the lever 194 is released by the cam disk 197, leaving the lever free to operate under the influence of the spring 198. The lever is prevented from operating, however, by the disk 192, until a time when the disk is returned to its initial position, as will be explained. The lever 194 is provided with a projection or catch 200 in position to coöperate with teeth 201 on a ratchet wheel 202 rigidly secured to a shaft 203. The shaft 203 carries a pinion 204 which meshes with a gear wheel 205 secured to the shaft 171. The shaft 171 also carries a pinion 206 which meshes with the teeth of the largest price gear 111. By this train of gearing the ratchet wheel 202 will be rotated in a clockwise direction whenever the price gears are being driven. The gear ratio is such that the ratchet wheel 202 is revolved comparatively rapidly so that a movement of an amount corresponding to one tooth on the ratchet wheel, represents a comparatively small movement of the price gears. The preferable arrangement is such that the movement of one tooth will correspond to the movement of the price gears necessary to register one cent on the counter when the largest price gear is connected with the counter. This ratio is not a necessary one, but is selected in order that the operation of the price gears may always be arrested by the lever 194 within an amount of movement representing the value of one cent. The high gear ratio of the drive for the ratchet wheel 202 is chosen so that comparatively large teeth may be employed on the ratchet wheel, thus insuring a positive stop of the ratchet wheel without jumping any teeth when the stop 200 is brought into contact with the ratchet wheel. With the high gear ratio, this may be accomplished without the necessity of making a ratchet wheel of large diameter, which is also a desirable feature to secure a positive stop. The ratchet wheel and lever mechanism described is for the purpose of arresting the movement of the price gears when they have moved an amount proportional to the weight of an article upon the scale pan. This is accomplished when the contact member 182 strikes the trip stop 32. During the forward movement of the handle lever 66, the disk 31 is first clamped in its adjusted position. Afterward the rod 188 is released to extend the contact member 182 and to move the slip ring 192 beneath the end of the lever 194 and the lower end of the lever 196 is freed from the cam 197, the stop 120 being held out of contact with the ratchet wheel 202 by the slip ring 192. When these operations have taken place, the extended portion of the cam 175 moves beneath the contact part 174 of the lever 170 and releases the arm 114 from the catch 172. The arm 114 then begins to rotate, driven by the shaft 98, the rack 96 and the spring 92. After the arm 114 has moved the slight distance permitted by its bifurcated end, the set screw 118 strikes the lug 117 and carries the price gears around with the arm. This rotation of the price gears operates the counter at a speed proportional to the particular price gear connected by the shiftable gear train to the gear drum 124. The rotation of the price gears continues until the contact member 182 has moved an amount equal to the movement of the disk 31. When this occurs the contact member will strike the trip stop 32 and be rotated about its axis, driving the pinion 181 and the shaft 179 against the tension of the spring 183. This rotation of the shaft 179 will move the circular rack 187 and force the disk 192 along the shaft 28 and from beneath the end 193 of the lever 194. This will leave the lever 194 free to move on its pivot 195 under the influence of the spring 198 which will immediately snap the stop 200 into contact with the ratchet 202 and thus arrest the movement of the ratchet wheel. Since the ratchet wheel is geared to the price gears through the spur gear 205 and pinion 206, the price gears will be arrested also by the movement of the lever 194. In this way the rotation of the price gears is stopped after they have moved an amount proportional to the movement of the trip stop 32 which is in turn proportional to the weight of the article upon the scale pan. A small amount of rotation is required after the contact member 182 strikes the trip stop 32 before the disk 98 is moved a sufficient amount to release the lever 194. In this way the shaft 98 is rotated slightly past the position of the trip stop 32 before the price gears are arrested. In order that the movement of the price gears may be exactly equal to that of the trip stop, the lost motion connection between the shaft 98 and the price gears is provided, which permits a movement of the shaft 98 of an amount equal to that required for the release of the lever 194 before the movement of the price gears begin. In this way the extra movement of the shaft necessary to release the lever 194 is corrected and the total movement of the price gears is made exactly equal to the movement of the trip stop. In this way the register is driven an amount proportional both to the weight and price per pound of the article on the scale pan and is moved to register the total value of the article being weighed.

*Printing mechanism.*

After the value of an article has been set up in the counter, an impression is taken from the numbers on the peripheries of the counter disks to form a record of the computed value. The printing mechanism for performing this operation will best be understood from Figs. 3 and 7. A yoke member or frame 210 having side plates 211 is slidably carried on pins 212 projecting from the frame plate 25. A coil spring 213 is secured to a projection 214 on the frame 210 and to the upper supporting pin 212. The spring 213 normally urges the frame upwardly and forwardly toward the counter 120. The forward end of the frame 210 carries a shaft 215 on which is mounted a platen 216. The frame 210 is held in its retracted position by a cam cylinder 217 mounted on a shaft 218 which carries a pinion 219 meshing with a gear 220 secured to the handle shaft 67 (see also Fig. 6). As previously explained, the shaft 67 is rotated during the return movement of the operating lever 66, and as soon as this movement begins the pinion 219 will begin to rotate the cam cylinder 217 in a counter-clockwise direction, as viewed in Fig. 7. A slight rotation of the cam disk 217 frees the side 211 of the frame 210 from the shoulder 221 of the cam 217, thus permitting a forward movement of the printing frame under the influence of the spring 213, to force the platen 216 into contact with the counter 120 to take an impression from the number set up in the counter. It may so happen that when the price gears are arrested, the numerals of the counter wheels are not in exact alinement, due to the fact that the value of the article on the scale pan is not an exact unitary value. It is desirable before an impression is taken from the counter, to straighten the numeral wheels to cause the counter to indicate the nearest whole number to the value of the article. The shaft 123 is therefore provided with a star wheel 222 (Fig. 7) having notches corresponding to each of the numbers on the periphery of the wheel. A dog 223 is pivoted to the frame member 24 and has a beveled contact end 225 adapted to coöperate with the notches in the star wheel 222 to straighten the counter disks to bring the numerals on their peripheries into alinement to indicate the whole number nearest to the position at which the disks have been arrested. Experience has shown that there is sufficient flexibility in the parts constituting the driving connection between the shaft 23 and the price gears to permit the necessary adjustment of the star wheel to accomplish this straightening operation. Before a computing operation begins, the dog 223 is held in contact with the star wheel 222 by means of a projection 226 on a cam 227 carried by the cam shaft 82. The projection 226 has a sufficiently extended cam surface to hold the dog in contact with the star wheel 222 until after the gear connection has been established between the shaft 123 and the price gears in the manner previously described. This provision is necessary in order that the teeth of the pinion 135 may mesh properly with the teeth of the price gears when they are moved into contact with one another. The price gears are also held in fixed position during this operation by a spring pressed detent 228 (Fig. 11) which contacts with a notch 229 in a plate 230 secured to the face of the largest price gear 211. The price gears are so assembled relative to the shiftable gear train and the gear drum 124 that the pinion 135 will properly mesh when the price gears and the shaft 123 are held in their zero positions. After the gear connection is established between the price gears and the counter, the cam 227 is moved by the cam shaft 182 a sufficient amount to release the dog 223, leaving the counter free to rotate during the computing operation. Before the release of the printing frame 210, however, a second projection 231 on the cam 227 contacts with the dog 223 and forces it again into contact with the star wheel 222 to aline the numeral wheels in the manner explained. The cam extension 231 is just of sufficient extent to hold the dog 223 in contact with the star wheel 222 during the time that the platen 216 is in its forward position for taking an impression off the counter. This position of the printing frame is only maintained for a short time, the cam disk 217 being shaped to return the printing frame to its initial position immediately after the impression has been taken and to retain the printing frame in this retracted position during the remainder of the operation of the machine. The shaft 215 is provided at one end with a pinion 235 which is movable into and out of contact with a mutilated gear 236 secured to the shaft 67. When the pinion 235 is in its forward position to bring the platen 216 into contact with the counter, the pinion is moved away from the gear 236. When the platen is returned to its retracted position, however, the pinion 235 is brought into the path of movement of the teeth on the gear 236, which immediately begin to rotate the pinion 235 and the platen 216. This movement of the platen moves a strip of paper which is provided for receiving the impression a sufficient amount to bring the portion bearing the impression into a position where it may be torn from the strip and handed to the customer or otherwise disposed of, according to the system in use. A feed roller 237 is carried by a shaft 238 and is held resiliently in contact with the platen 216 by a spring 239 to assist the platen 216 in feeding the paper forward. The paper, when it leaves the platen, passes through a paper guide 240 into position to be torn from the end of the strip fed to the platen. A printing ribbon is provided for producing the impressions on the strip of paper, and the ends of the ribbon are wound on spools 241 carried on shafts 242 driven by a horizontal shaft 243 provided with a ratchet wheel 244. The ratchet wheel 244 is operated by a pawl 245 pivoted at 246 on an oscillatory arm 247. A spring 248 holds the pawl in contact with the ratchet. The arm 247 is given an oscillatory movement by a cam member 249 carried by the shaft 218 each time the shaft 218 is rotated. In this way the ribbon is fed a short distance past the printing position after each printing operation. Any well known ribbon reversing mechanism may be employed for reversing the direction of movement of the ribbon when necessary. A spring pressed pawl 250 holds the platen 216 against accidental movement.

*Price gear accelerating device.*

As previously stated, the registering device or counter 120 is driven during the computing operation by the movement of the price gears 111 under the influence of the spring 92 which drives the rack 96. It will now be understood that a train of gears of considerable length is driven during this operation and there is therefore a considerable inertia to be overcome when these gears are first being put into motion. In order to accelerate the first part of the movement of the computing mechanism, a bell crank lever 251 (Fig. 6) is pivotally mounted on the shaft 67 adjacent the arm 95. The arm 252 of the bell crank lever has its rear edge positioned to coöperate with a pin 253 projecting from a disk 254 secured to the cam shaft 82. As soon as the operating handle begins its forward movement, the cam shaft 82 will begin to rotate as previously described, and the pin 253 will bear against the arm 252 and move the bell crank 251 to the left as seen in the figure. The other arm 255 of the bell crank lever carries a coil spring 256 which has one end attached to the lever 95 by means of the opening 257 therein. By this arrangement, the initial movement of the operating lever places the spring 256 under tension which is transmitted to the arm 95 and as soon as the computing mechanism is released in the manner previously described, the tension of the spring 256 is added to that of the spring 92 during the initial movement of the lever 95, thus giving the lever and the computing mechanism driven thereby a quick start. As soon as the computing mechanism is once well in motion, the tension of the spring 92 is sufficient to maintain a sufficiently rapid movement thereof.

*Price gear and counter return.*

After the printing operation has been completed by the initial return movement of the operating lever, and after the dog 223 has been moved out of contact with the star wheel 222 to release the counter disks, the counter disks and the price gears may be returned to their initial position. As previously stated, the nose 106 of the dog 99 is moved downwardly when the operating handle 66 reaches its extreme forward position. As the handle returns, therefore, under the influence of the spring 78, this dog is in position to strike the stop plate 105 in whatever position this plate and the arm 95 may have been left when the movement of the price gears was arrested. As the lever 66 moves backwardly, therefore, the arm 95 will be picked up and carried with the lever until it reaches its initial position. This of course will rotate the price gears and the counter back to their zero positions. When the arm 95 has been carried backwardly a sufficient distance, the upwardly projecting finger 107 will strike the pin 110 and move the nose of the dog upwardly out of contact with the stop plate 105. After the release of the dog 99 the operating handle 66 continues in its movement until the other parts of the machine have been restored to their initial positions in a manner to be described. When the arm 95 is released from the dog 99, the spring 92 has a tendency to rotate it again about the shaft 67. It is prevented from such rotation, however, by the catch 172 which again engages the projection 173 on the arm 114. In order that the catch 172 may have ample time to be moved by the spring 176 into engaging position before the arm 95 is released, the pin 110 is so placed that the arm 95 is not released until it has swung a short distance past its initial position. This permits the catch 172 to swing upwardly before the release of the computing mechanism and hence when the arm 95 is released, it will move backwardly a slight amount, indicated by the space 260 (Fig. 11) before it contacts with the catch 172. The catch 172 is properly proportioned to hold the price gears and counter in zero position after this slight return movement.

When the operating handle is disconnected from the arm 95, it continues in its direction of movement to complete the rotation of the cam shaft 82 which, among other things, forces the dog 223 into contact with the star wheel 122 to lock the counter in zero position. It is important to make certain that the arm 95 has been brought back to zero before this locking occurs, and since it requires some time for the spring 92 to overcome the inertia of the computing gears and start them back in the opposite direction to be checked and held by catch 172, it is desirable to provide positive means to assure this return before the locking of the counter. This is made all the more necessary since there is a tendency for the operator to accelerate the movement of the operating handle when it is freed from the lever 95 and so hasten the locking operation. To assure proper coöperation in this respect, a pin is secured to arm 95 in position to bear against disk 254 when the arm 95 is in zero position. The disk 254 is provided with a depression 254″ in position to come opposite the pin 254′ at the proper time to permit the movement of arm 95 past zero. The depression 254″ is properly proportioned to bring the end thereof into contact with pin 254′ in time to assist the spring 92 to return the arm 95 to zero. Since disk 254 is driven by the operating handle directly, the depression can be properly positioned to force the arm 95 back to zero before the locking of the counter. The use of the disk 254 to return arm 95 places the force necessary for this operation upon the operating lever, and so overcomes the tendency to acceleration due to the disconnection of the lever from the arm 95. The catch 172 does not, however, operate directly on the price gear 111, but on the arm 114 which is secured to the shaft 98 as previously explained, and since there is a slight lost motion between this arm and the price gears, the catch 172 is not sufficient to hold the price gears from return movement past zero. This is prevented, however, by the detent 228, as previously explained.

It will be seen from Fig. 11 that during the return movement of the price gears, the ratchet wheel 202 will be given a return rotation by means of the gear wheel 205 and pinion 206 meshing with the largest price gear 111. If the lever 194 were permitted to remain in position with the stop 200 in contact with the ratchet wheel during this return movement, a considerable braking effect would be placed upon the moving parts, due to the fact that the spring 176 must be comparatively stiff to insure positive arrest of the computing mechanism at the proper time in the computing operation. To avoid this necessity, an auxiliary detent 261 is pivotally mounted at 262 and is provided with a catch 263 for engaging the teeth of the ratchet 202. The detent 261 has an arm 264 provided with a comparatively light coil spring 265 for moving the catch 263 against the ratchet wheel. The end 266 of the detent 261 bears on a cam disk 267 carried by the shaft 82. This cam disk 267 is so proportioned that the detent 261 will be held out of contact with the ratchet wheel 202 during the forward movement of the operating lever in order that it may not interfere with the proper control of the ratchet wheel by means of the lever 194. As soon as the operating lever begins its return movement, however, the detent 261 is released and moves into contact with the ratchet wheel under the influence of its spring 265. Immediately thereafter and before the return movement of the price gears begin, the lever 194 is moved by its cam disk to disengage the catch 200 from the ratchet wheel and leave the ratchet wheel in position held by the detent 263 against the tension of the spring 92 on the operating arm 95. In order that the ratchet wheel 202 may not be released until the dog 106 has come into contact with the arm 95 to receive the pressure exerted by the spring 92 regardless of the position of the arm 95, it is necessary that the detent 261 be allowed to remain in contact with the ratchet wheel 202 until the arm 95 is entirely restored to its initial position, because it may have been moved only a very short distance from this position during the computing operation, if an article of very small value was being sold. For this reason, the detent 261 is permitted to come into contact with the ratchet wheel 202 at the beginning of the return stroke of the operating handle and remain in contact until after the arm 95 has been locked in its initial position. The contact point 263 will ride over the notches 201 of the ratchet wheel 202 during the rotation of the wheel, but since the spring 265 is only a very light one, this contact of the catch 263 with the ratchet wheel teeth is not a serious matter as would be the case if the stop 200 actuated by the heavy spring 176 were permitted to bear upon the teeth. After the price gears have finally been locked in their initial position, the cam shaft 82 continues to rotate a short distance and the detent 261 is again forced out of contact with the ratchet wheel in position for the next operation. The cam disk 197 continues to hold the lever 194 out of contact with the ratchet wheel 202 after the operating lever 66 has reached its final position.

During the computing operation, when the contact member 182 was operated to release the lever 194 to arrest the movement of the price gears, the end of the lever 193 was sprung in behind the shoulder formed by the slide ring 192, as shown in Fig. 2, and thus the slide ring and rack 187 were prevented from returning to their original position under the influence of the spring 183, thus holding the contact member 182 in its retracted position. It is necessary to lock the rack 187 before the lever 194 is moved out of disengagement with the ratchet wheel 202 since otherwise this movement of the lever 194 would again release the rack 187 and contact member 182 and permit the contact member to return to its extended position. This locking of the rack 187 is accomplished by the cam disk 189 which is provided with a beveled edge 270 which is slid in behind the angular finger 190 on the rod 188 to hold the rod 188 from rotation and thus secure the rack 187 and the contact member 182 in their retracted position. The beveled surface 270 will return the rack 187 to its extreme retracted position and thus provide sufficient clearance between the contact member 182 and the trip stop 32 so that the contact member will not strike the stop during the return rotation of the price gears. This position of the rack 187 is a little more retracted than that in which it is held by the lever 194 cooperating with the shoulder formed by the slide ring 192, since the lever 194 merely holds the rack in the position to which it was moved when the contact member 182 barely cleared the trip stop 32. As soon as the contact member 182 has been locked in its retracted position, the cam disk 167 engages the beveled edge of the contact point 166 of the lever 165 and forces the lever 165 upwardly to release the scale disk 31 which is then free to return to its initial position or to move into any position to which it may be turned by the removal of the article from the scale pan.

Key return.

After the price gears and counter have reached their initial position, the shiftable gear train which connects these two members, may be disengaged from the price gears and the price key which has been depressed may be restored to shift the gear frame back to its initial position. This is accomplished during the movement of the operating lever after the catch has secured the price gears in their restored position. The first step in this operation occurs when the cam disk 146 moves to bring the depressed portion 147 opposite the cam roller 145. This permits the gear frame 125 to move to the left as viewed in Fig. 10, under the influence of gravity to disengage the pinion 135 from the price gear and to cause the cam roller 141 again to contact with the cam track 143. After this occurs, the depressed price key may be restored. The mechanism for restoring the price key will best be understood by reference to Figs. 2, 7 and 9. Superimposed upon the rack bar 53 and slidable relative thereto, is a second rack bar 275 which is provided with a spring 276 normally holding the bar in an upper position, as shown in Fig. 9. The bar 275 is provided with a slot 277 which coöperates with a pin 278 on the frame member 24. The pin 278 also coöperates with a slot 279 in the rack bar 52, shown in broken lines in Fig. 9. A second slot 280 is formed in the bar 275 and coöperates with a pin 281 secured to the bar 52. When the price key 42 is depressed, the bar 52 is free to move upwardly without affecting the position of the bar 275. Secured to the shaft 67 is a gear wheel 282 which meshes with a pinion 283 carried by the shaft 284 (see also Fig. 3). The shaft 284 has also secured thereto a gear segment 285 and a cam disk 286 having a projection 287 carried thereon arranged to coöperate with the end of a lever 288 rigid with the arm 49 of the universal lock 50. During the return stroke of the operating handle 66, the pinion 283 is given a complete revolution in a counter-clockwise direction, as viewed in Fig. 9. This will swing the gear segment 285 about the center of the shaft 284 as an axis and bring the teeth of the gear segment into contact with the teeth 289 of the rack 275, during the latter part of the movement of the operating handle and after the shiftable gear train has been disengaged from the price gears, in the manner previously described. The last part of the rotation of the gear segment 285 will move the rack 275 downwardly and will pick up the pin 281 on the rack 52 by means of the upper end of the slot 280, and return the pin 281 and the rack 52 to their initial position from whatever position they have been moved into by the rotation of the shaft 33 when the price gear 42 was depressed. Just before the rack 52 reaches its restored position, the extension 287 on the cam 286 will move the lever 288 upwardly thus lifting the universal lock bar 50 out of engagement with the notch in the depressed price key and leaving the key free to move upwardly under the influence of its spring 47. This will release the pressure on the bar 56 and permit the detent 55 to be drawn into contact with the disk 39 on the shaft 33 by means of the spring 58. As the shaft 33 is rotated during the return movement of the rack 52, the notch in the disk 39 will be brought again to its initial position, and since the detent 55 is drawn resiliently against the periphery of the disk, the end of the detent will be sprung into the notch as soon as the rack is restored, and the parts will again be locked in their original positions, ready for a new operation.

Price exhibiting device.

To assist in preventing fraud on the part of a clerk, a device is provided for exhibiting to the customer and others in the room, the price at which a sale is being made. This device is best shown in Figs. 3, 7 and 9, and consists of a numeral wheel 290 carried by a shaft 291 provided with a pinion 292 by which it is rotated. The pinion 292 meshes with teeth 293 on a rack bar 294 which is mounted to slide on pins 295 secured to the frame member 24. The numeral wheel 290 is provided with a series of numbers 296 corresponding to the numbers on the price keys 42. An opening is provided on the customer's side of the casing and the rack bar 294 is moved an amount to bring the number representing the price at which a sale is being made opposite this opening, whenever a price key is depressed. The movement of the rack 294 is produced by means of the pinion 54 secured to the shaft 33 and which meshes with teeth 297 on the lower end of the bar 294. Since the amount of rotation of the shaft 33 is controlled by the particular price key depressed, the numerals may be arranged on the wheel 290 in such a way that the same number will be exhibited through the opening in the casing as that of the price key depressed. The number wheel 290 is provided also with a series of raised numerals 298 which are brought into position to contact with the platen 216' of the printing device, and to register the price at which a sale is being made at the same time that the total value is being printed. Since the number wheel 290 is set at the very beginning of the sale when the price key is depressed, and remains in position until the computing operation is completed, a sufficient length of time is allowed for inspection of the price and the impression numeral 298 is allowed to remain in position to produce an impression upon the strip of paper at the time of the printing operation. The numerals 298 on the wheel 290, as well as the numerals on the counter disks 121, are inverted and reversed in order to cause the numerals to appear properly on the printed slip. Since the numeral wheel 290 remains permanently in mesh with the rack bar 294, the wheel will be restored to its original position at the same time that the price keys ar restored.

*Totalizer.*

In some businesses it is desirable to know the total amount of sales during a given period, as for a day, and also the amount of sales made by different individual salesmen. Mechanism is provided for ascertaining these values, as shown in Figs. 3, 7 and 8. A gear wheel 300 is mounted for rotation on the shaft 98 and is driven from the counter shaft 123 through a pair of pinions 301 and 302 (Fig. 8) which mesh with a pinion 303 secured to the counter shaft. The pinions 301, 302 and 303 are all of the same size, so that the rotation of the gear wheel 300 is the same as if the wheel meshed directly with the pinion 303 on the counter shaft. The reason for the intermediate pinions is to bridge the space between the wheel 300 and the pinion 303. A plurality of totalizers 304 are supported on brackets 305 which are secured to the frame member 25 and are arranged in an arc about the shaft 98 as a center. The totalizers 304 are of the same character as the counter 120 except that they are constructed with more number wheels in order that they may record higher values than those recorded by the counter 120. The totalizers 304 are driven by shafts 306 which carry pinions 307 in position to mesh with the teeth of the gear wheel 300. The pinions 307 have circular racks 308 secured thereto, the racks 308 being provided with clutch members 309 at the ends thereof opposite the pinions 307. The clutch members 309 are arranged to mesh with coöperating members 310 by means of which the pinions 307 may be secured to the shafts 306 to drive the totalizers 304. An arcuate frame member 312 is supported by arms 313 projecting from the frame plate 24, and the frame member 312 is provided with a series of bearings 314 in which are journaled operating rods 316 provided with gear segments 317 which mesh with the circular racks 308. All of the operating rods 316 except one are provided with angular finger pieces 319 by which the rods 316 may be rotated to shift the clutches 309 into and out of engagement with their coöperating members 310, to make or break the driving connection between the gear wheel 300 and the totalizers. Each salesman has assigned to him one of the totalizers 304 which he connects with the gear wheel 300 by turning the handle 319 of his particular totalizer whenever he uses the scale to make a computation. Since the pinions 307 are made the same size as the pinion 303 on the counter shaft, the particular shaft 306 connected with the gear wheel 300 at any operation will be rotated the same amount as the counter shaft 123, and therefore the counter 304 so connected will be operated an amount equal to the amount set up in the counter, that is the amount representing the value of the sale made. In order that the successive sales made by the attendant may be added to one another, mechanism is provided for disconnecting the totalizers from the gear 300 during the return movement of the gear 300. To accomplish this disconnection of the counters, a toothed segment 320 is pivotally mounted on the shaft 98, as shown in Fig. 8, and is provided with a plurality of teeth 321, there being one tooth for each of the totalizers. The operating rods 316 are provided at their ends opposite the finger pieces 319 with projecting pins 322 which extend into the path of movement of the teeth 321. A bell crank lever 323 is pivoted at 324 on the frame plate 24 and has one arm 325 thereof provided with a slot 326 which engages a pin 327 extending from the face of the segment 320. The other arm 328 of the bell crank lever is provided with a contact member 329 which bears upon a cam disk 330 carried on the cam shaft 82. A coil spring 331 normally draws the contact member 329 against the periphery of the disk 330. During the forward stroke of the operating handle, there is no movement of the bell crank lever 323, but at the beginning of the return stroke of the handle, and before the shaft 98 begins its return rotation, the cam disk 330 moves the bell crank lever 323 and forces the teeth 321 on the segment 320 into contact with the pins 322 on the operating rods 316, and thus disconnects all of the totalizers 304 from their driving pinions 307. In this way there is no return movement of the counter disks in the totalizers, and the amount registered at each operation is added to that previously set up in the totalizers. Since the amount of each individual sale is inserted only in the totalizer of the particular clerk who made the sale, a separate totalizer must be provided for computing the grand total of all the sales made in a given time. In order therefore to provide one totalizer which shall be in mesh with the gear wheel 300 for every sale made, one of the operating shafts 316 is provided with a pin 332 in lieu of the finger piece 319 of the other operating rods. A spring 333 is connected with the pin 332 and normally rotates the shaft 316 in a direction to force the clutch 309 in mesh with the coöperating member 310. In this way the totalizer 304 is provided with the operating spring 333 is automatically thrown into operating position for each computation which is made, so that this totalizer will indicate the grand total of all sales made. Each totalizer is provided with a finger piece 334 for resetting the totalizer to zero whenever necessary.

It is also desirable to exhibit to the customer the total value of his purchase and this is done by means of an additional counter 335 similar in every respect to the counters 304 but mounted on the side of the machine which faces the counter, and having its operating pinion permanently in mesh with the gear wheel 300 instead of being provided with a rod 316 and clutch 309. By this arrangement the counter 335 is driven at each computing operation an amount equal to the amount of movement of the main counter 120 and so exhibits to the customer the same value as that registered by the main counter. The counter 335 is of course returned to zero after each operation, since it is permanently in mesh with the gear 300 and will of course be rotated backwardly during the return movement of this gear an amount equal to the amount it was driven forwardly during the forward movement of the gear.

*Mechanism for ascertaining an amount of a given value.*

It sometimes happens that a customer, instead of buying by weight, desires to purchase an amount of a given value, and mechanism is provided for ascertaining how much of the article being sold is required to amount to the value asked for by the customer. This mechanism will best be understood from Figs. 1, 13 and 14. Secured to the end of the price shaft 33 is a pinion 340, Fig. 16, which meshes with a pinion 341 secured to the lower end of a shaft 342 which is mounted for rotation in brackets 343 secured to the frame plate 20. A pinion 344 on the upper end of the shaft 342 meshes with a pinion 345 secured to a shaft 346 rotatably mounted in the frame members 20 and 21 and in alinement with the scale shaft 28. A wheel 347 of the same diameter as the scale wheel 29 is carried on the shaft 346 and is provided with a peripheral ring 348 which carries two sets of scale divisions 349 and 350 on the outer periphery thereof. The wheel 347 is constrained to rotate with the shaft 346 by means of a key 351, but is free to slide longitudinally along the shaft. A circular rack 352 is rigidly secured to the hub of the wheel 347 and meshes with a pinion 353 carried on a shaft 354 rotatably mounted in brackets 355 secured to the frame member 20. The shaft 354 is provided at its lower end with a bifurcated contact arm 356 (see also Fig. 14). A projection 357 is provided with a pin 358 which is arranged to contact with the longer arm 359 of the contact member 356 when the wheel 347 has made a complete rotation from its initial position. When this occurs, the pin 358 will move the contact member 356 into the position shown in broken lines in Fig. 14. This movement of the contact member will rotate the shaft 354 and cause the pinion 353 to operate the rack 352, and slide the wheel 347 longitudinally along the shaft 346, the amount of movement of the wheel along the shaft being equal to the width of the scale 349 on the periphery of the same. The scale 349 is normally positioned opposite an opening 360 in the scale casing. After the first turn of the wheel, however, the sliding movement of the wheel along the shaft 346 as described, will bring the scale division 350 in position to be read through the opening 360. The scale 349 is divided into twenty-four equal divisions corresponding in length to the divisions on the scale disk 29 representing pounds. The twenty-four divisions on the scale 349 are numbered to correspond to prices per pound ranging from eight to thirty-one cents inclusive, and each division is sub-divided into a number of parts equal to the particular price represented by that division. The scale 350 is also divided into twenty-four equal divisions which are in turn sub-divided to represent prices continuing from the highest price represented on the scale 349. Since the wheel 349 is shifted to bring scale 350 opposite the opening 360 after the first rotation of the wheel, it follows that the scale divisions on the wheel 347 representing the prices from eight to forty cents, will be successively brought opposite the opening 360 in the scale casing when the wheel 347 is rotated. When the wheel 347 has been turned more than one revolution, so that it has been moved along the shaft 346, the pin 358 on the return rotation of the wheel 347 will strike the short arm 361 on the contact member 356 and rotate the shaft 354 to return the wheel to its initial position longitudinally of the shaft 346. Since the wheel 347 is driven through a gear train connected with the price shaft 33, it follows that the amount of rotation of the wheel 347 will depend upon the particular price key depressed, and the parts are so proportioned that whenever a key is depressed a scale division 349 or 350 is brought opposite the opening 360 representing the same price as that represented by the depressed key. The opening 360 in the casing is placed adjacent the opening 361 through which the weight indicated by the scale 29 is read. If a customer wishes to buy an amount of a particular value, at a given price, the operator first presses the key representing that price, which sets the computing mechanism for operation at the price selected, and also brings the scale corresponding to that particular price, opposite the opening 360. In Fig. 15, the scale representing twelve cents per pound is shown opposite the opening 360. If the customer has, for example, asked for ten cents worth of an article which sells at twelve cents per pound, the operator now places an amount of the article on the scale pan, of sufficient weight to bring the zero scale reading opposite the tenth division of the scale which appear through the opening 360. This shows that the weight on the scale pan is ten twelfths of a pound, or corresponds to a value of ten cents. In the same way an amount having a particular value at other prices may be ascertained. In the particular embodiment illustrated, the amount so ascertained is limited to a maximum of one pound, but of course the device may be constructed to extend this amount if the conditions of the trade require. After the amount of the value asked for has been placed upon the scale pan, the handle 66 is operated in the usual manner and the ticket is printed giving the value of the article and the price at which it is sold, in the same way as previously described.

The operation of the various parts has been described in connection with the description of the construction of these parts, and it is believed that further description of the operation of the machine is not necessary. The movements of the operator are reduced to a minimum and the personal element is completely removed from the computing operation. The salesman merely presses the key representing the price at which a sale is to be made, places the article upon the scale pan and moves the operating lever to its extreme forward position where it is released. The machine computes the value of the article, exhibits to the customer the price at which it is sold and the total value, and prints a ticket on which these values are recorded. The total of sales made by each operator is also kept, as well as the grand total of all sales made. The article may be sold to the customer by weight or he may be given an amount of a particular value if he prefers to purchase by this method.

I claim:

1. In combination, a counter, a device for driving said counter, a catch for arresting the movement of said driving device, and weight-controlled means for releasing said catch to cause the arrest of said movement when said driving device has moved an amount proportional to the weight of an article.

2. In combination, a register, a shaft for operating said register, a driving device for rotating said shaft, a catch for arresting the movement of said driving device and for absorbing the force of the impact due to said arrest, and weight-controlled means for causing said catch to operate to arrest said driving device when said driving device has moved an amount proportional to the weight of an article.

3. In combination, a weight-controlled scale having a stop member and means for moving said stop member an amount proportional to the weight of an article, a register, a device for operating said register, a device for arresting the movement of said register operating device, and a yielding contact member arranged to coöperate with said stop member to control said device for arresting the movement of said register operating device.

4. The combination with computing mechanism, of spring means for driving said mechanism, a catch for arresting the movement of said mechanism, and a weight-controlled device for governing the operation of said catch.

5. The combination with computing mechanism, of a spring for driving said mechanism, a catch for arresting the movement of said mechanism and for absorbing the impact due to said arrest, and a weight-actuated scale for controlling said catch.

6. The combination with computing mechanism, of resilient means for driving said mechanism, a catch for arresting the movement of said mechanism, means for holding said catch in inoperative position, and weight-controlled mechanism for releasing said catch to cause the arrest of said computing mechanism when said mechanism has moved an amount proportional to the weight of an article.

7. The combination with computing mechanism, of resilient means for operating said mechanism, a weight-actuated device, means for fixedly securing said device against movement, means for arresting the motion of said computing mechanism and yielding means controlled by said weight-actuated device when held against movement for controlling the operation of said motion-arresting device.

8. The combination with computing mechanism, of resilient means for driving said mechanism, a weight-actuated device for controlling said mechanism, means for securing said device against movement, a catch for arresting the movement of said computing mechanism, and yielding means controlled by said weight-actuated device for governing said catch to cause the arrest of the movement of said computing mechanism and absorb the force of the impact due to said arrest.

9. The combination with computing mechanism, of resilient means for driving said mechanism, a weight-actuated device for controlling said mechanism, a catch for arresting the movement of said mechanism and for absorbing the impact due to said arrest, without imparting the force of said impact to said weight-actuated device, and means for yieldingly contacting with said weight-actuated device for governing the operation of said catch.

10. The combination with computing mechanism, of resilient means for operating said mechanism, a weight-actuated device for controlling the operation of said mechanism, a trip stop carried by said weight-actuated device, means for securing said weight-actuated device against movement, a catch for arresting the movement of said computing mechanism and for absorbing the force of the impact due to said arrest, and yielding contact member arranged to coöperate with said trip stop to cause said catch to arrest the movement of said computing mechanism when said computing mechanism has moved an amount proportional to the movement of said weight-actuated device.

11. The combination with computing mechanism comprising a register and a variable speed device for driving said register amounts proportional to various prices per unit weight, of a weight-actuated device, and means controlled by said weight-actuated device for arresting the movement of said computing mechanism and for absorbing the impact due to said arrest independently of said weight-actuated device, when said computing mechanism has moved an amount proportional to the movement of said weight-actuated device.

12. The combination with computing mechanism comprising a register and spring-actuated means for driving said register, of a weight-actuated member for controlling said computing mechanism, means for securely holding said member against movement, a trip stop carried by said member, a catch for arresting the movement of said computing mechanism and for absorbing the impact due to said arrest, and a contact member arranged to yieldingly coöperate with said trip stop to cause the operation of said catch when said computing mechanism has moved an amount proportional to the movement of said weight-actuated member.

13. The combination with computing mechanism, of resilient means for driving said mechanism, an operating handle for controlling said resilient means, and a weight-controlled device for arresting the movement of said resilient means independently of the movement of said handle to control the computing operation.

14. The combination with computing mechanism, of resilient means for driving said mechanism, an operating handle, means actuated by said handle for controlling the operation of said resilient means to cause said resilient means to begin operation after the beginning of the movement of said handle, and a weight-controlled device for arresting the movement of said resilient means during the movement of said handle to control a computing operation.

15. The combination with computing mechanism, of a spring for driving said mechanism, a weight-controlled device for arresting the movement of said mechanism, a catch for preventing movement of said mechanism prior to a computing operation, an operating handle, and mechanism operated by said handle for releasing said catch after the movement of said handle has begun.

16. The combination with computing mechanism, of a spring drive for said mechanism, a catch for holding said mechanism from operation against the tension of said spring drive, an operating handle and means for releasing said catch during the movement of said operating handle, a weight-controlled stop for arresting the movement of said mechanism and means for clamping said stop in fixed position prior to the release of said catch.

17. The combination with computing mechanism of a spring drive for said mechanism, a catch for holding said mechanism against movement against the tension of said spring drive, an operating handle, and mechanism controlled by said handle for releasing said catch during the movement of said handle, and weight-controlled mechanism for arresting the movement of said computing mechanism.

18. The combination with computing mechanism, of a spring drive for said mechanism, an operating handle, means controlled by said handle for setting said drive in motion during the first part of the movement of said handle, weight-controlled means for arresting said computing mechanism when it has moved an amount proportional to the weight of an article, and mechanism controlled by said handle for recording the value computed by said computing mechanism.

19. The combination with computing mechanism, of a spring drive for said mechanism, a catch for holding said mechanism from movement against the tension of said drive, an operating handle, mechanism driven by said handle for releasing said catch to permit a computing operation, weight-controlled means for arresting the movement of said computing mechanism, and mechanism controlled by said handle for recording subsequent to the arrest of said computing mechanism, the value computed thereby.

20. The combination with computing mechanism, of a spring drive for said mechanism, a catch for holding said mechanism from movement against the tension of said drive, an operating handle, mechanism driven by said handle for releasing said catch, weight-controlled means for arresting the movement of said computing mechanism during the movement of said handle, and means operated by said handle for restoring said computing mechanism to its initial position.

21. The combination with computing mechanism, of a spring drive for said mechanism, an operating handle, means controlled by said handle for starting the operation of said computing mechanism, a ratchet wheel, a gear train for driving said ratchet wheel from said computing mechanism, and a catch for stopping the movement of said ratchet wheel for arresting the operation of said computing mechanism.

22. The combination with computing mechanism, of a spring drive for said mechanism, an operating handle, a catch for holding said computing mechanism from movement against the tension of said spring drive, means controlled by said handle to release said catch, a ratchet wheel arranged to be driven by said computing mechanism during the operation thereof, a weight-actuated catch for controlling said ratchet wheel to arrest the movement of said computing mechanism, and weight-controlled means for controlling said catch for stopping the movement of said ratchet wheel and computing mechanism when said computing mechanism has moved an amount proportional to the weight of an article.

23. The combination with computing mechanism, of a spring drive for said mechanism, a catch for holding said mechanism from movement against the tension of said drive, a second catch for arresting the movement of said computing mechanism, an operating handle, a cam shaft driven by said handle, and cams controlled by said operating shaft for governing the movement of said catches.

24. In a computing scale, a series of price gears, a spring-actuated device for rotating said price gears, a catch for holding said price gears from movement against the tension of said spring-actuated device, an operating handle, means controlled by said operating handle for releasing said catch to permit said price gears to begin rotation, and weight-controlled means for arresting the movement of said price gears independently of the movement of said operating handle.

25. In a computing scale, a series of price gears, a spring-actuated rack for rotating said price gears, an operating handle, and means controlled by said handle for causing said rack to begin movement after the beginning of the movement of said handle and weight-controlled means for arresting the movement of said price gears independently of the movement of said handle.

26. In a computing scale, the combination with computing mechanism, of a spring-actuated drive for said computing mechanism, an operating handle, means controlled by said handle for starting the movement of said drive during the forward movement of said handle, weight controlled mechanism for arresting the movement of said drive, and means carried by said handle for returning said drive to its initial position during the return movement of said handle, but arranged to permit forward movement of said drive independently of said handle.

27. In a computing scale, the combination with computing mechanism, of a pivotally mounted spring-actuated arm for driving said mechanism, an operating handle mounted for concentric movement with said arm, and a device movable into one position to permit independent movement of said arm and handle and into another position to cause said arm and handle to move in unison with one another.

28. In a computing scale, the combination with computing mechanism, of a pivotally mounted arm for driving said mechanism, a spring for actuating said arm, an operating handle mounted for concentric movement with said arm, a second spring of greater strength than said first mentioned spring and operating handle, and means for causing said arm to move in unison with said handle under the tension of said second mentioned spring and against the tension of said first mentioned spring to return said arm to its initial position after a computing operation.

29. In a computing scale, the combination with computing mechanism, of a spring-actuated arm for operating said mechanism, an operating handle, and means for connecting said arm with said handle to cause said arm to be moved by said handle to its initial position, and for releasing said arm from said handle to permit further movement of said handle in the same direction after said arm has reached its initial position.

30. In a computing scale, a rotary driving device, spring means for operating said driving device, weight controlled means for arresting said driving device during the forward movement thereof, a handle for returning said driving device to its initial position, means for releasing said handle from said driving device when said driving device has reached its initial position to permit further movement of said handle, and a catch for holding said driving device when it has been so returned.

31. In a computing scale, the combination with a driving device, of spring means for actuating said driving device, weight-controlled mechanism for arresting said driving device when said device has moved an amount proportional to the weight of an article, an operating handle, mechanism driven by said handle for returning said driving device to its initial position, means for holding said driving device when so returned, and means for disconnecting said handle from said returning mechanism to permit further movement of said handle after said driving device is secured in its initial position.

32. In a computing scale, the combination with rotary price gears, of spring-actuated mechanism for rotating said price gears, weight-controlled means for arresting the movement of said price gears when said price gears have moved an amount proportional to the weight of an article, an operating handle, mechanism driven by said handle for returning said price gears to their initial position, means for securing said price gears in said position, and means for disconnecting said handle from said returning means to permit movement of said handle subsequent to the return of said price gears.

33. In a computing scale, the combination with rotary price gears, of spring-actuated means for rotating said price gears, weight-controlled means for arresting the movement of said price gears when said price gears have moved an amount proportional to the weight of an article, an operating handle, means carried by said handle for returning said price gears after rotation thereof, a catch for securing said price gears in their initial position when so returned, and mechanism for disconnecting said price gears from said handle, said mechanism being arranged to carry said price gears slightly past their initial position to permit the operation of said catch prior to the release of said price gears from said handle.

34. In a computing scale, the combination with price gears, of spring-actuated means for rotating said price gears, an operating handle, means for connecting said price gears with said handle to cause the return of said price gears to their initial position after the operation thereof, a catch for securing said price gears when so returned, and means for disconnecting said price gears from said handle to permit further movement of said handle after the return of said price gears, said disconnecting means being arranged to carry said price gears slightly past their initial position to provide time for the operation of said catch before the release of said price gears from said handle.

35. In a computing scale, a series of rotary price gears, a ratchet wheel geared to said price gears to be driven thereby, a weight-controlled catch for stopping the movement of said ratchet wheel to arrest the movement of said price gears when they have been moved an amount proportional to the weight of an article, a supplementary ratchet for coöperation with said ratchet wheel during the return movement of said ratchet wheel and means for holding said weight-controlled catch out of contact with said ratchet wheel during the return movement thereof.

36. In a computing scale, the combination with price gears, of a ratchet wheel having operative connection with said price gear, a catch for stopping the movement of said ratchet wheel to arrest rotation of said price gear, a supplemental catch for coöperation with said ratchet wheel during the return movement thereof and means for holding said weight-controlled catch out of contact with said ratchet wheel during the return movement thereof.

37. In a computing scale, the combination with a spring-actuated price gear, a ratchet wheel connected with said price gear to be driven thereby, a catch for stopping the rotation of said ratchet wheel to arrest the movement of said price gear, a supplementary catch, means for moving said supplementary catch into contact with said ratchet wheel subsequent to the arrest thereof, and means for moving said first-mentioned catch out of contact with said ratchet wheel prior to the return rotation of said ratchet wheel.

38. In a computing scale, a register, price gears for driving said register, a shiftable gear train for connecting said register with said price gears, a catch for arresting the movement of said price gears, means for holding said catch out of connection with said price gears during the shifting of said gear train, means movable into operative position after the shifting of said gear train, for holding said catch out of operative connection with said price gears, mechanism for moving said first-mentioned holding means out of operative connection with said catch subsequent to the movement of said second holding means into operative relation with said catch, and weight-controlled means for releasing said catch from said second mentioned holding means to cause the arrest of said price gears when said price gears have moved an amount proportional to the weight of an article.

39. In a computing scale, the combination with a system of price gears, of spring-actuated means for driving said price gears, a spring actuated catch for arresting the movement of said price gears, means for holding said catch out of connection with said price gears during the movement of said price gears, and weight-controlled means for shifting said holding means to release said catch when said price gears have rotated an amount proportional to the weight of an article.

40. In a computing scale, the combination with a system of price gears, of a spring-actuated catch for arresting the movement of said price gears, means for holding said catch out of contact with said price gears, and weight-controlled mechanism for releasing said catch when said price gears have moved an amount proportional to the weight of an article.

41. In a computing scale, the combination with a system of price gears, of spring-actuated means for driving said price gears, a catch for arresting the movement of said price gears, a stop for holding said catch out of connection with said price gears and movable into and out of operative relation with said catch, a weight-controlled device for moving said stop, a second stop for holding said catch out of connection with said price gears, and means for operating said second stop to cause said stop to coöperate with said catch while said weight-controlled device is being placed in operative condition.

42. In a computing scale, the combination with a set of price gears, of spring actuated means for driving said price gears, a catch for arresting the movement of said price gears, a stop for holding said catch out of operative connection with said price gears, weight controlled mechanism for moving said stop into and out of operative position relative to said catch, a cam for holding said catch out of connection with said price gears and in position to permit shifting of said stop means for moving said cam to release said catch while said stop is in position to engage said catch, and means for causing said weight actuated device to move said stop to release said catch when said price gears have rotated an amount proportional to the weight of an article.

43. In a computing scale, a counter, mechanism for driving said counter, weight-controlled means for arresting said driving mechanism when said mechanism has been moved an amount proportional to the weight of an article, and means for truing said counter to cause said counter to indicate the whole number nearest the position it occupies when said mechanism is arrested.

44. In a computing scale, the combination with a counter, price gears for driving said counter, weight-controlled means for arresting said price gears when said price gears have been moved an amount proportional to the weight of an article, and means for truing said counter to cause said counter to indicate the whole number nearest the position occupied by said counter when said price gears are arrested.

45. In a computing scale, a counter, driving mechanism for said counter, means for arresting the movement of said driving mechanism when said counter has moved an amount proportional to the weight of an article, and means for truing said counter subsequent to the arrest of said driving mechanism to cause said counter to indicate the whole number value nearest the value indicated by said counter when said driving mechanism is arrested.

46. In a computing scale, the combination with a plurality of price gears, of a counter and means for selectively connecting said counter with said price gears to be driven thereby, weight-controlled means for arresting the movement of said counter when said price gears have moved an amount proportional to the weight of an article, and means for truing said counter to cause said counter to indicate the whole number value nearest the value indicated by said counter when said price gears are arrested.

47. The combination with computing mechanism, of a spring drive for said mechanism, and auxiliary means for assisting said drive during a part of the movement thereof.

48. The combination with computing mechanism, of a spring drive for said mechanism and auxiliary means for assisting said drive during the first part of the movement thereof.

49. The combination with computing mechanism, of means for driving said mechanism, and auxiliary means for assisting said driving means during the first part of the movement of said computing mechanism.

50. The combination with computing mechanism, of a spring drive for said mechanism, an auxiliary spring for assisting said drive, and means for causing said auxiliary spring to exert additional driving force to said computing mechanism during the first part of the movement of said mechanism, to assist said spring drive to overcome the inertia of the moving parts of said computing mechanism.

51. The combination with computing mechanism, of a spring drive for said mechanism, an operating handle, means for releasing said spring drive to cause said drive to operate said computing mechanism, and means for transmitting pressure from said handle to assist said spring drive during the beginning of the movement of said computing mechanism.

52. The combination with computing mechanism, of a spring-actuated arm for driving said mechanism, an operating handle, means controlled by said handle for releasing said arm to cause said arm to drive said mechanism, an auxiliary spring for driving said arm, and means operated by said handle for causing said auxiliary spring to exert pressure on said arm during the first part of the movement thereof to assist in driving said computing mechanism.

53. The combination with computing mechanism, of a drive for said mechanism, means for operating said drive, means for releasing said drive from said operating means, and a device driven by said operating means for reversing the direction of motion of said drive after the release of said operating means therefrom.

54. The combination with computing mechanism, of a drive for said mechanism, a handle for restoring said drive to its initial position after an operation thereof, means for releasing said handle from said drive, and means driven by said handle after said releasing operation for reversing the direction of motion of said computing mechanism.

55. The combination with computing mechanism, of a spring drive for said mechanism, a handle for restoring said drive against the tension of its spring after an operation thereof, and arranged to carry said drive slightly past zero position, means for releasing said handle from said drive, and means operated by said handle after said release for returning said drive to zero.

56. The combination with computing mechanism, of a spring drive for said mechanism, an operating handle for said drive, means for connecting said handle with said drive to cause said handle to restore said drive after an operation thereof, a catch for holding said drive and computing mechanism in zero position, means for releasing said drive from said handle when said drive has been moved slightly past zero position, and mechanism driven by said handle after said release for restoring said drive and computing mechanism to zero.

In testimony whereof I have signed my name to this specification, in the presence of two subscribing witnesses, on this 3rd day of April, A. D. 1916.

OTTO MALCHER.

Witnesses:
   CHARLES H. SEEM,
   A. J. CRANE.